United States Patent [19]

Shaw et al.

[11] Patent Number: 4,728,192

[45] Date of Patent: Mar. 1, 1988

[54] GATED FIBER OPTIC ROTATION SENSOR WITH EXTENDED DYNAMIC RANGE

[75] Inventors: Herbert J. Shaw; Byoung Y. Kim, both of Stanford, Calif.

[73] Assignee: Stanford University, Stanford, Calif.

[21] Appl. No.: 581,304

[22] Filed: Feb. 17, 1984

[51] Int. Cl.⁴ ............................................. G01C 19/64
[52] U.S. Cl. .................................................. 356/350
[58] Field of Search .................... 356/350, 351; 372/94

[56] References Cited

U.S. PATENT DOCUMENTS

| | | | |
|---|---|---|---|
| 3,512,890 | 5/1970 | McLaughlin | 356/350 |
| 4,299,490 | 11/1981 | Cahill et al. | 356/350 |
| 4,372,685 | 2/1983 | Ulrich | 356/350 |
| 4,410,275 | 10/1983 | Shaw et al. | 356/350 |
| 4,556,321 | 12/1985 | Schiffner | 356/350 |

FOREIGN PATENT DOCUMENTS

| | | | |
|---|---|---|---|
| 1154955 | 12/1980 | Canada | 356/350 |
| 3104786 | 9/1982 | Fed. Rep. of Germany | 356/350 |
| WO83/04305 | 12/1983 | PCT Int'l Appl. | |
| 1141727 | 1/1969 | United Kingdom | |
| 2100855 | 6/1981 | United Kingdom | 356/350 |

OTHER PUBLICATIONS

"Techniques for Shot Noise Limited Inertial Rotation Measurement Using a Multiturn Fiber Sagnac Interferometer", Davis et al., SPIE, vol. 157, 1978, pp. 131-136.
Henning, M. L., et al., "Optical Fibre Hydrophones with Down Lead Insensitivity," *Proceedings of the First International Conference on Optical Fibre Sensors*, London, pp. 23-27, 1983.
Martin, et al., "Fiber-Optic Laser Gyro Signal Detection and Processing Technique," *SPIE*, vol. 139, pp. 98-102, 1978.
Davis, J. L. and Ezekiel, S., "Closed-Loop Low-Noise Fiber-Optic Rotation Sensor," *Optics Letters*, vol. 6, No. 10, Oct. 1981.
Kim, B. Y., et al., "Harmonic Feed-Back Approach to Fiber Gyro Scale Factor Stabilization," *International Conference on Optical Fibre Sensors*, London, Apr. 26-28, 1983.
R. Ulrich, "Fiber-Optic Rotation Sensing with Low Drift," *Optics Letters*, vol. 5, No. 5, May 1980.
R. A. Bergh, et al., "All-Single-Mode Fiber-Optic Gyroscope," *Optics Letters*, vol. 6, No. 4, Apr. 1981.
R. A. Bergh, et al., "All-Single-Mode Fiber-Optic Gyroscope with Long-Term Stability," *Optics Letters*, vol. 6, No. 10, Oct., 1981.
H. C. Lefevre, et al., "All-Fi-Er Gyroscope with Inertial-Navigation Short-Term Sensitivity," *Optics Letters*, vol. 7, No. 9, Sep. 1982.
B. Y. Kim, et al., "Response of Fiber Tyros to Signals Introduced at the Second Harmonic of the Bias Modulation Frequency," SPIE Conference Proceedings held in San Diego, California, vol. 425, pp. 86-89, Aug. 1983.

*Primary Examiner*—Davis L. Willis
*Assistant Examiner*—S. A. Turner
*Attorney, Agent, or Firm*—Knobbe, Martens, Olson & Bear

[57] ABSTRACT

A fiber optic rotation sensor, employing the Sagnac effect comprising all fiber optic components positioned along a continuous, uninterrupted strand of fiber optic material. The rotation sensor includes a detection system utilizing a modulator or modulators for phase modulating at first and second frequencies light waves which counter-propagate through a loop formed in the fiber optic strand. The second modulation frequency is much lower than the first frequency. An output signal from the sensor is gated synchronously with respect to the phase modulation at the second frequency so that the detected optical output signal is provided only during selected intervals of the phase modulation at the second frequency.

A phase sensitive detector generates a feedback error signal proportional to the magnitude of the optical output signal at the first phase modulation frequency. The feedback error signal controls a modulator which controls the amplitude of the second frequency driving signal for the phase modulator such that the signal at the first phase modulation frequency in the output signal from the rotation sensor is substantially cancelled by the phase difference modulation produced at the second modulation frequency during the interval when the optical output signal is present.

29 Claims, 33 Drawing Figures

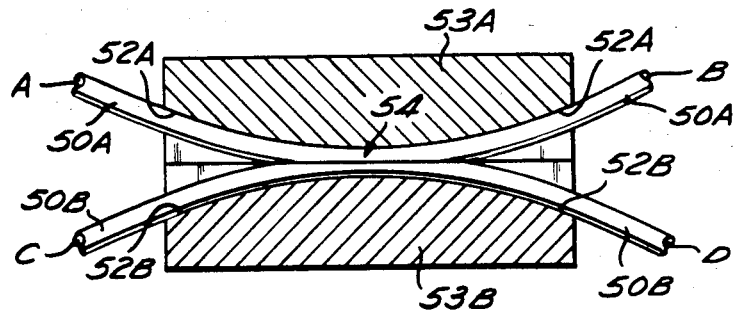
Fig. 2 (PRIOR ART)
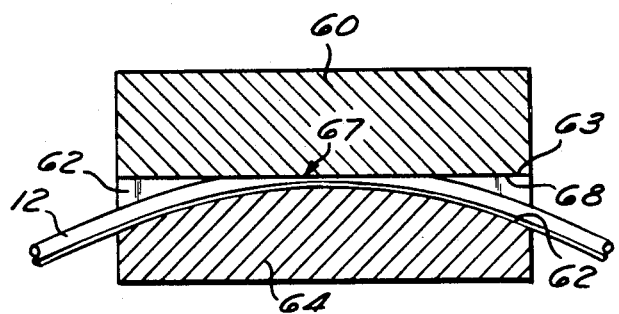
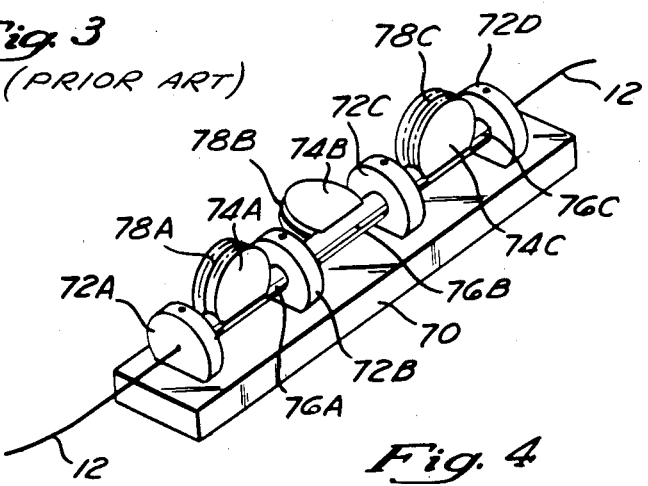
Fig. 3 (PRIOR ART)
Fig. 4 (PRIOR ART)

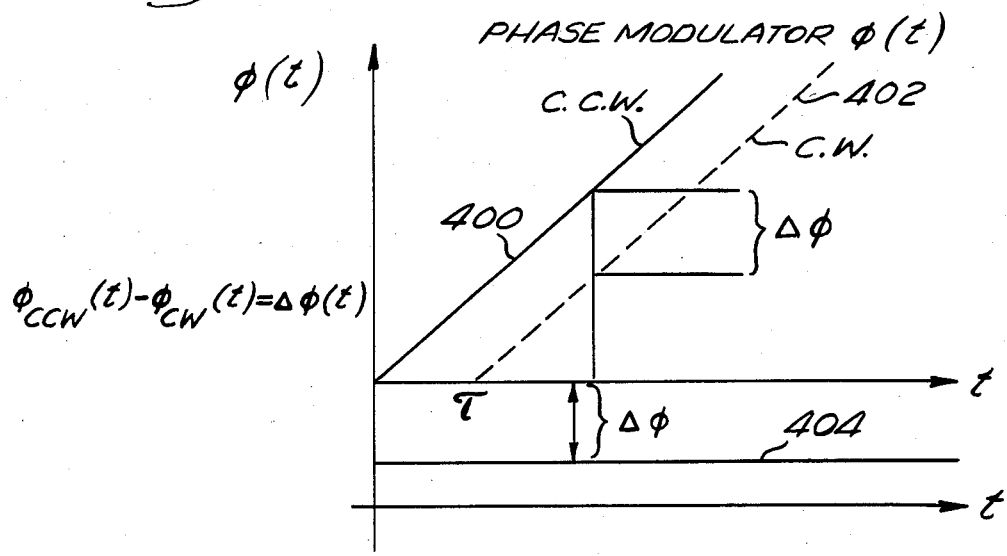
Fig. 23
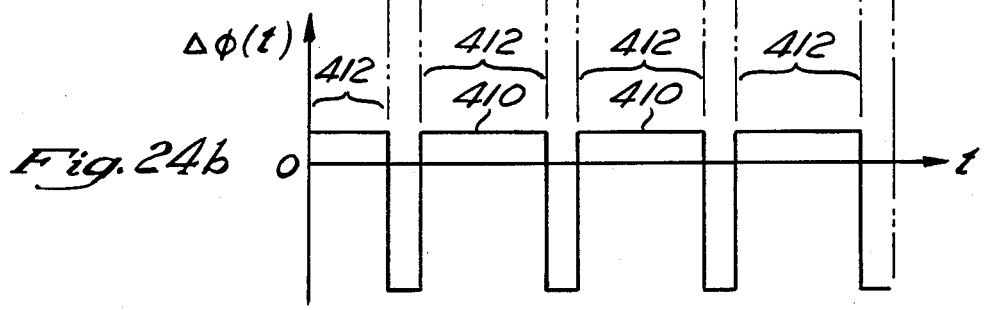
Fig. 24a
Fig. 24b
Fig. 24

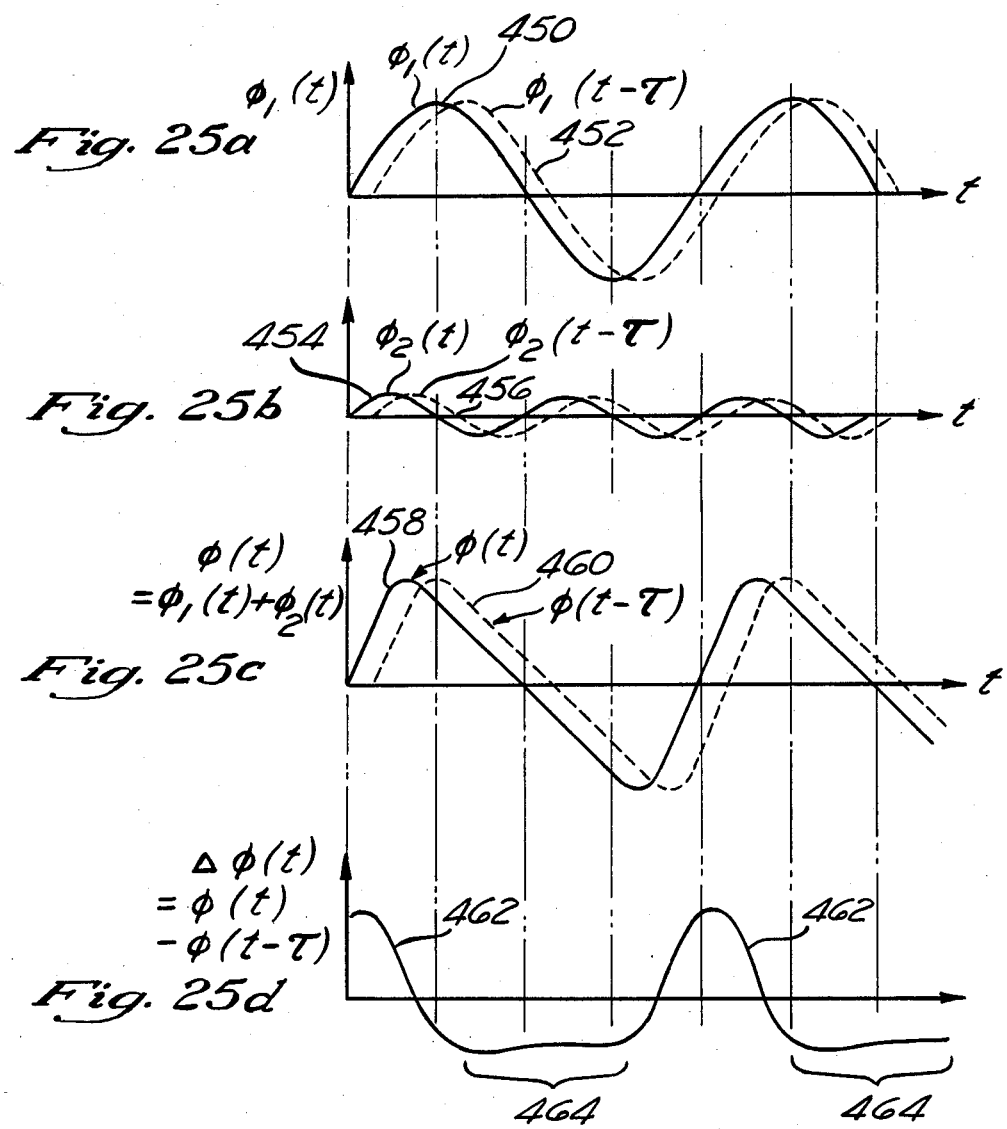
Fig. 25a
Fig. 25b
Fig. 25c
Fig. 25d
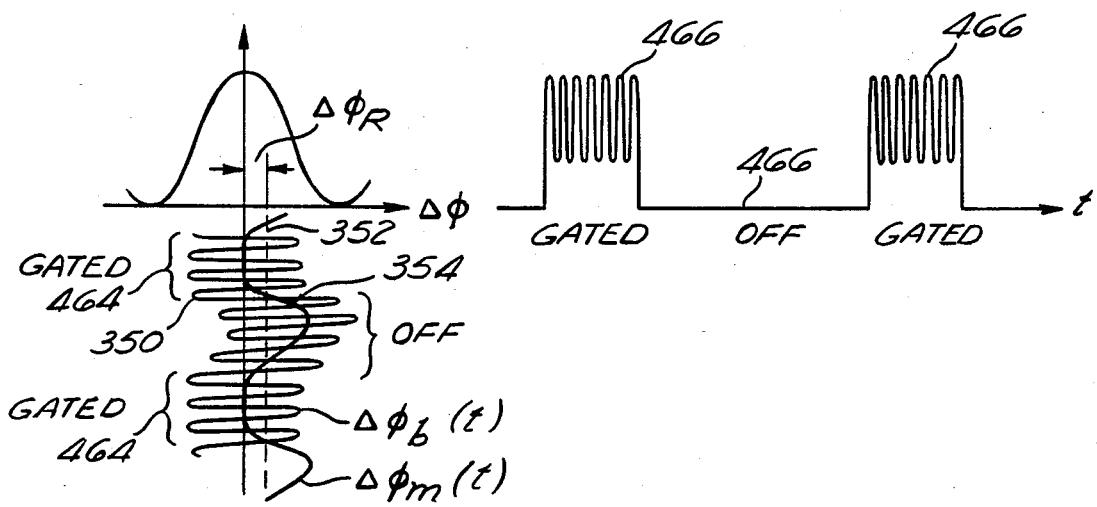
Fig. 26

GATED FIBER OPTIC ROTATION SENSOR WITH EXTENDED DYNAMIC RANGE

BACKGROUND OF THE INVENTION

The present invention relates to rotation sensors, such as gyroscopes, and particularly to a fiber optic rotation sensor which has an extended dynamic range.

Fiber optic rotation sensors typically comprise a loop of fiber optic material to which light waves are coupled for propagation around the loop in opposite directions. Rotation of the loop creates a relative phase difference between counter-propagating waves, in accordance with the well known "Sagnac effect", with the amount of phase difference corresponding to the velocity of rotation. The counter-propagating waves, when recombined, interfere constructively or destructively to produce an optical output signal which varies in intensity in accordance with the rotation rate of the loop. Rotation sensing is commonly accomplished by detection of this optical output signal.

Various techniques have been devised to increase the sensitivity of fiber optic rotation sensors to small rotation velocities. However, most of these techniques have not been useable for detecting very large rotation velocities because the output functions tend to repeat themselves at various velocities of rotation. As a result, the output signal cannot be utilized to determine which of those possible rotation velocities having the same output signal waveform is responsible for the particular output signal waveform observed.

Thus, it would be a great improvement in the art to provide a phase modulation technique wherein rotation could be accurately and reliably sensed over a very broad range of rotation velocities. Such a technique, and means for its accomplishment are described herein.

BRIEF SUMMARY OF THE INVENTION

The present invention comprises a rotation sensor and method of its operation for accurately and reliably sensing a broad range of rotational velocities. The rotation sensor comprises all fiber optic components, such as a fiber optic directional coupler which (a) splits the light from the source into two waves that propagate around the sensing loop in opposite directions, and (b) combines the counter-propagating waves to provide an optical output signal. Proper polarization of the applied light, the counter-propagating waves, and the optical output signal is established, controlled, and maintained by a fiber optic polarizer and fiber optic polarization controllers. A second fiber optic coupler is provided to couple the optical output signal from the continuous strand to a photodetector which outputs an electrical signal that is proportional to the intensity of the optical signal.

Improved operating stability and sensitivity of the rotation sensor is achieved by phase modulating the counter-propagating waves at a first frequency (the bias phase modulation frequency) using a first phase modulator, thereby biasing the phase of the optical output signal. A phase sensitive detection system is utilized to measure the first harmonic component of the optical output signal intensity. In the detection system disclosed, the amplitude of this first harmonic component is proportional to the rotation rate of the loop.

A second phase modulation signal is provided at an arbitrary frequency which is much lower than that of the bias frequency. It is preferable that the second phase modulation frequency not be harmonically related to the first phase modulation frequency. This second phase modulation signal may be imposed on the system through the first phase modulator or, alternatively, a second phase modulator may be utilized. The optical output signal is gated in synchronism with the second phase modulation frequency, such that the output signal represents the phase difference modulation produced, for example, during the positive half cycle of the second phase modulation, while presenting a value of zero during the negative half cycle of the second phase modulation. By adjusting the amplitude of the second modulation signal, the influence of the Sagnac phase shift can be effectively cancelled so that the time average value of the optical output signal during the positive half cycle of the second modulation is zero. Thus, it is seen that the amplitude of the second modulaton signal is utilized as the means for cancelling the Sagnac phase shift, and thus this magnitude is representative of the amount of Sagnac phase shift which is present in the system.

In order to adjust the magnitude of the second phase modulation signal, the first phase modulation frequency component in the gated portion of the output signal is used to generate a feedback error signal which is fed back to control the amplitude of the second phase modulation driving signal.

A feedback error correction modulator controls the amplitude of the second modulation driving signal in accordance with the feedback error signal, which corresponds to the amplitude of the optical output signal which is caused by the Sagnac phase shift.

Stored in a memory is rotation rate data related by a transfer function to the amplitude of the second phase modulation that cancels the first phase modulation frequency component in the optical output signal caused by rotation. The "cancellation" amplitude of the lower frequency signal that is sufficient to cancel or limit the first phase modulation frequency component caused by the Sagnac effect is then converted to the rotation rate by accessing the memory using the amplitude of the cancellation signal as the address. The rotation rate data so accessed can then be used directly or converted into a signal which can be interpreted to derive the Sagnac phase shift or the velocity of rotation.

It has been found that amplitude modulation in odd harmonics of the optical output signal, caused by the phase modulator (either directly or indirectly, through polarization modulation), may be eliminated by operating the phase modulator at a specific frequency. Since the detection system utilized detects only an odd harmonic (e.g., the first harmonic), the effects of phase modulator induced amplitude modulation may be eliminated by operating at such frequency. This eliminates a significant source of error in rotation sensing, and thereby increases the accuracy of the rotation sensor.

In another preferred embodiment of the invention, a modification of phase modulation waveforms provides a phase difference modulation whose amplitude has the same wavelength dependence to the applied driving signal as the Sagnac phase shift has to the rotation rate. Thus, a substantially linear scale factor is created. With a linearized scale factor, the amplitude of the phase difference modulation at the second frequency is proportional to the Sagnac phase shift in the counter-propagating light waves in the rotation sensor loop. In this embodiment, the phase difference modulation comprises a substantially constant, DC value which can be adjusted to cancel the DC phase difference modulation of the counter-propagating light waves (the Sagnac phase shift) with a simplified, linear function.

One means for creating a substantially linear scale factor is through use of a phase ramp which is applied to the counter-propagating waves by means of a modulator located at an asymmetric location in the sensing loop of the gyroscope. Application of the phase ramp produces a DC differential phase shift between counter-propagating waves. However, commonly used fiber optic phase modulators cannot provide a phase ramp. Thus, the phase ramp is simulated through use of periodically repeating waveforms having a ramp portion.

One such waveform is a saw-tooth wave, which may be simulated by combining the phase modulation at one frequency with that modulation at its second harmonic frequency, and adjusting the phase and amplitude relationships to approximately simulate the saw-tooth modulation waveform. Because of the resetting process at the peak of each sawtooth waveform, and because of the reciprocity of the two optical paths of the counter-propagating waves, the phase difference cannot be constant in time. This problem is overcome by substituting the saw-tooth waveform for the second modulation signal of the embodiment first described above. With that substitution, the optical output signal is gated on during the period of time when the ramp portion of the saw-tooth wave is present, and the output signal is gated off at all other times. Thus, by adjusting the amplitude or frequency of the second modulation in the manner described above, the DC Sagnac phase shift can be nulled out by the DC phase difference modulation produced by the phase ramp when the output signal is gated on, and the zero Sagnac phase shift is also simulated during the period when the output signal is gated off.

Gating of the output signal may take place at the light source or at or after the detector. The slope of the phase ramp which determines the differential phase shift is controlled by adjusting the modulation amplitude of the saw-tooth wave modulation signal. This is accomplished by use of the error feedback signal, and the error correction modulator, as was described above.

Of course, a triangle waveform phase modulation is yet another type of waveform which may be utilized in the same manner as the saw-tooth wave modulation. Such a triangle waveform may be created through combination of the modulation frequency and the third harmonic of that modulation frequency.

BRIEF DESCRIPTION OF THE DRAWINGS

These and other advantages of the present invention are best understood with reference to the drawings in which:

FIG. 2 is a sectional view of one embodiment of a fiber optic directional coupler for use in the rotation sensor of FIG. 1;

FIG. 3 is a sectional view of one embodiment of a fiber optic polarizer for use in the rotation sensor of FIG. 1;

FIG. 4 is a perspective view of one embodiment of a fiber optic polarization controller for use in the rotation sensor of FIG. 1;

FIG. 23 is a graph illustrating the relative phase difference between the interfering waves which are modulated by a ramp waveform;

FIG. 24 is a diagram illustrating the relative phase between the interfering waves which are modulated by a saw-tooth waveform, and the phase difference between those interfering waves;

FIG. 25 is a graphical illustration of one method of forming a saw-tooth wave and further illustrating the relative phase between the interfering waves which are modulated by the saw-tooth waveform, as well as illustrating the phase difference between those interfering waves;

FIG. 26 is a diagram of the overall phase shift resulting from the bias phase modulation and the lower frequency saw-tooth waveform phase modulation in conjunction with a constant bias resulting from the Sagnac effect, and the output signal which results from gating;

DETAILED DESCRIPTION OF THE PREFERRED EMBODIMENT

Figure 1:
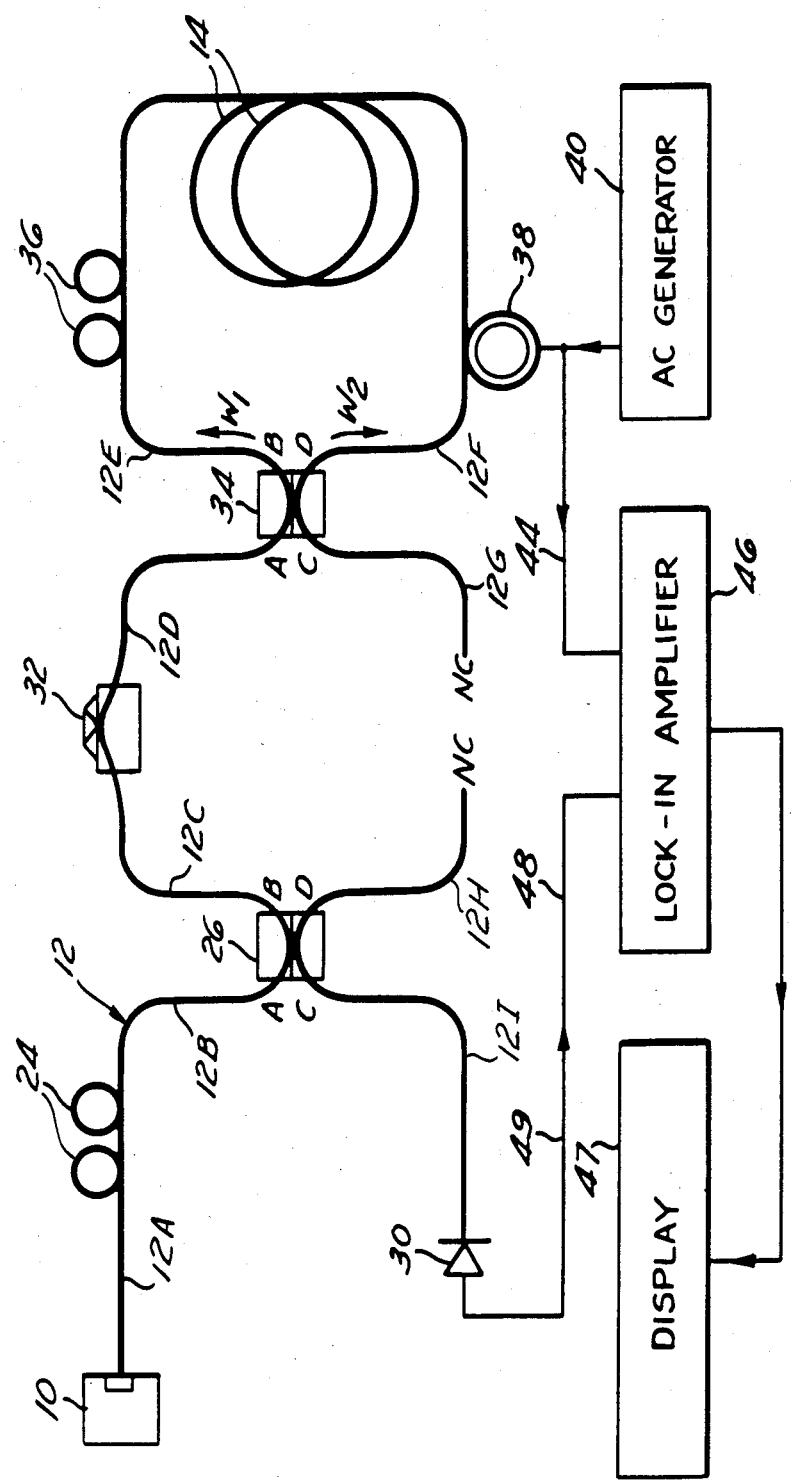
FIG. 1 is a schematic drawing of a basic rotation sensor, having the fiber optic components positioned along a continuous, uninterrupted strand of fiber optic material, and further showing the signal generator, photodetector, lock-in amplifier, and display associated with the detection system.

Before proceeding with a discussion of the preferred embodiment of the invention, a discussion of the basic rotation sensor used in the invention is necessary for a fuller understanding of the improvement. FIG. 1 shows a rotation sensor having a basic structure which is of the type used in the present invention. It includes a light source 10 for introducing light into a continuous length or strand of optical fiber 12, a portion of which is wound into a sensing loop 14. As used herein, the reference numeral 12 designates generally the entire continuous strand of optical fiber, while the numeral 12 with letter suffixes (A, B, C, etc.) designates portions of the optical fiber 12.

In the embodiment shown, the light source 10 comprises a galium arsenide (GaAs) laser which produces light having a wave length on the order of 0.82 microns. By way of specific example, the light source 10 may comprise a model GO-DIP laser diode, commercially available from General Optronics Corp., 3005 Hadley Road, South Plainfield, N.J. The fiber optic strands such as the strand 12 are preferably single mode fibers having, for example, an outer diameter of 80 microns and a core diameter of 4 microns. The loop 14 comprises a plurality of turns of the fiber 12 wrapped about a spool or other suitable support (not shown). By way of specific example, the loop 14 may have approximately 1000 turns of fiber wound on a form having a diameter of 14 centimeters.

Preferably, the loop 14 is wound symmetrically, starting from the center, so that symmetrical points in the loop 14 are in proximity. It is believed that this reduces the environmental sensitivity of the rotation sensor, since symmetry causes the time varying temperature and pressure gradients to have a similar effect on both of the counter-propagating waves.

Light from the source 10 is optically coupled to one end of the fiber 12 by butting the fiber 12 against the light source 10. Various components for guiding and processing the light are positioned or formed at various locations along the continuous strand 12. For the purpose of describing the relative locations of these components, the continuous fiber 12 will be described as being divided into seven portions, labeled 12A through 12G, respectively, with the portion 12A through 12E being on the side of the loop 14 that is coupled to the source 10, and the portions 12F and 12G being on the opposite side of the loop 14.

Adjacent to the light source 10, between the fiber portions 12A and 12B, is a polarization controller 24. A type of polarization controller suitable for use as the controller 24 is described in detail in co-pending patent application Ser. No. 183,975 filed Sept. 4, 1980, entitled "Fiber Optic Polarization Converter", assigned to the assignee of the present invention, and is hereby incorporated by reference. A brief description of the polarization controllers 24 will be provided subsequently. However, it should be presently understood that this controller 24 permits adjustment of both the state and direction of polarization of the applied light.

The fiber 12 then passes through ports labeled A and B of a directional coupler 26, located between the fiber portions 12B and 12C. The coupler 26 couples optical power to a second strand of optical fiber which passes through the ports labeled C and D of the coupler 26, the port C being on the same side of the coupler as the port A, and the port D being on the same side of the coupler as the port B. The end of the fiber 28 extending from the port D terminates non-reflectively at the point labeled "NC" (for "not connected") while the end of the fiber 29 extending from the port C is optically coupled to a photodetector 30. By way of specific example, the photodetector 30 may comprise a standard, reverse biased, silicon, PIN-type, photo diode. The coupler 26 is described in detail in co-pending patent application Ser. No. 300,955, filed Sept. 10, 1981, entitled "Fiber Optic Directional Coupler" which is a continuation-in-part of patent application Ser. No. 139,511, filed Apr. 11, 1980, entitled "Fiber Optic Directional Coupler", both of said patent applications being assigned to the assignee of the present invention. These co-pending patent applications are hereby incorporated by reference.

The fiber portion 12C extending from port B of the coupler 26 passes through a polarizer 32, located between the fiber portions 12C and 12D. A monomode optical fiber has two polarization modes of travel for any light wave. The polarizer 32 permits passage of light in one of the polarization modes of the fiber 12, while preventing passage of light in the other polarization mode. Preferably, the polarization controller 24 mentioned above is used to adjust the polarization of the applied light so that such polarization is substantially the same as the polarization mode passed by the polarizer 32. This reduces the loss of optical power as the applied light propagates through the polarizer. A preferred type of polarizer for use in the present invention is described in detail in co-pending patent application Ser. No. 195,934, filed Oct. 10, 1980, entitled "Polarizer and Method", assigned to the assignee of the present invention, and is hereby incorporated by reference.

After passing through the polarizer 32, the fiber 12 passes through ports labeled A and B of a directional coupler 34, located between the fiber portions 12D and 12E. This coupler 34 is preferably of the same type as described above in reference to the coupler 26. The fiber 12 is then wound into the loop 14, with a polarization controller 36 located between the loop 14 and fiber portion 12E. This polarization controller 36 may be of the type discussed in reference to the controller 24, and is utilized to adjust the polarization of the light waves counter-propagating through the loop 14 so that the optical output signal, formed by interference of these counter-propagating waves, has a polarization which will be efficiently passed by the polarizer 32 with minimal optical power loss. Thus, by utilizing both the polarization controllers 24 and 36, the polarization of the light propagating through the fiber 12 may be adjusted for maximum optical power output.

A phase modulator 38 driven by an AC signal generator 40 is mounted in the fiber segment 12F between the loop 14 and the second directional coupler 34. This modulator 38 comprises a PZT cylinder, around which the fiber 12 is wrapped. The fiber 12 is bonded to the cylinder so that when it expands radially in response to the modulating signal from the generator 40, it stretches the fiber 12.

An alternative type of modulator (not shown), suitable for use with the present invention, comprises a PZT cylinder which longitudinally stretches four segments of the fiber 12 bonded to short lengths of capillary tubing at the ends of the cylinder. Those skilled in the art will recognize that this alternative type of modulator may impart a lesser degree of polarization modulation to the propagating optical signal than the modulator 38; however, it will be seen subsequently that the modulator 38 may be operated at a frequency which eliminates the undesirable effects of polarization modulation. Thus, either type of modulator is suitable for use in the present invention.

The fiber 12 then passes through ports labeled C and D of the coupler 34, with the fiber portion 12F extending from the port D and the fiber portion 12G extending from the port C. Fiber portion 12G terminates non-reflectively at a point labeled "NC" (for "not connected").

The output signal from the AC generator 40 is supplied on a line 44 to a lock-in amplifier 46 as a reference signal, which lock-in amplifier 46 also is connected to receive the output of the photodetector 30 by a line 48. This signal on the line 44 to the amplifier 46 provides a reference signal for enabling the amplifier 46 to synchronously detect the detector output signal at the modulation frequency, i.e., the first harmonic component of the optical output signal, of the modulator 38 while blocking all other harmonics of this frequency.

Lock-in amplifiers are well known in the art and are commercially available.

It will be seen below that the magnitude of the first harmonic component of the detector output signal is proportional through a certain limited operating range to the rotation rate of the loop 14. The amplifier 46 outputs a signal which is proportional to this first harmonic component, and thus provides a direct indication of the rotation rate, which may be visually displayed on a display panel 47. However, the scheme of detection shown in FIG. 1 can only be used for relatively small rotation rates as will be seen in connection with the discussion of FIG. 9.

The Couplers 26 and 34

A preferred fiber optic directional coupler for use as the couplers 26 and 34 in the rotation sensor or gyroscope of the present invention is illustrated in FIG. 2. The coupler comprises two optical fiber strands labeled 50A, 50B in FIG. 2, of a single mode fiber optic material having a portion of the cladding removed from one side thereof. The two strands 50A and 50B are mounted in respective arcuate slots 52A and 52B, formed in respective blocks 53A and 53B. The strands 50A and 50B are positioned with the portions of the strands where the cladding has been removed in close spaced relationship, to form a region of interaction 54 in which the light is transferred between the core portions of the strands. The amount of material removed is such that the core portion of each strand 50A and 50B is within the evanescent field of the other. The center-to-center spacing between the strands at the center of the coupler is typically less than about 2-3 core diameters.

It is important to note that the light transferred between the strands at the region of interaction 54 is directional. That is, substantially all of the light applied to input port A is delivered to the output ports B and D, without contra-directional coupling to port C. Likewise, substantially all of the light applied to input port C is delivered to the output ports B and D. Further, this directivity is symmetrical. Thus, light supplied to either input port B or input port D is delivered to the output ports A and C. Moreover, the coupler is essentially non-discriminatory with respect to polarizations, and thus preserves the polarization of the coupled light. Thus, for example, if a light beam having a vertical polarization is input to port A, the light coupled from port A to port D, as well as the light passing straight through from port A to port B, will remain vertically polarized.

From the foregoing, it can be seen that the coupler may function as a beam-splitter to divide the applied light into two counter-propagating waves W1, W2 (FIG. 1). Further, the coupler may additionally function to recombine the counter-propagating waves after they have traversed the loop 14 (FIG. 1).

In the embodiment shown, each of the couplers 26, 34 has a coupling efficiency of fifty percent, as this choice of coupling efficiency provides maximum optical power at the photodetector 30 (FIG. 1). As used herein, the term "coupling efficiency" is defined as the power ratio of the coupled power to the total output power, expressed as a percent. For example, referring to FIG. 2, if light is applied to port A, the coupling efficiency would be equal to the ratio of the power at port D to the sum of the power output at ports B and D. Further, a coupling efficiency of 50% for the coupler 34 insures that the counter-propagating waves W1, W2 are equal magnitude.

The Polarizer 32

A preferred polarizer for use in the rotation sensor of FIG. 1 is illustrated in FIG. 3. This polarizer includes a birefringent crystal 60, positioned within the evanescent field of light transmitted by the fiber 12. The fiber 12 is mounted in a slot 62 which opens to the upper face 63 of a generally rectangular quartz block 64. The slot 62 has an arcuately curved bottom wall, and the fiber is mounted in the slot 62 so that it follows the contour of this bottom wall. The upper surface 63 of the block 64 is lapped to remove a portion of the cladding from the fiber 12 in a region 67. The crystal 60 is mounted on the block 64, with the lower surface 68 of the crystal facing the upper surface 63 of the block 64, to position the crystal 60 within the evanescent field of the fiber 12.

The relative indices of refraction of the fiber 12 and the birefrigent material 60 are selected so that the wave velocity of the desired polarization mode is greater in the birefringent crystal 60 than in the fiber 12, while the wave velocity of an undesired polarization mode is greater in the fiber 12 than in the birefringent crystal 60. The light of the desired polarization mode remains guided by the core portion of the fiber 12, whereas light of the undesired polarization mode is coupled from the fiber 12 to the birefringent crystal 60. Thus, the polarizer 32 permits passage of light in one polarization mode, while preventing passage of light in the other polarization mode. As previously indicated, the polarization controllers 24, 36 (FIG. 1) may be utilized to adjust the polarizations of the applied light and optical output signal, respectively, so that optical power loss through the polarizer is minimized.

The Polarization Controllers 24, 36

One type of polarization controller suitable for use in the rotation sensor of FIG. 1 is illustrated in FIG. 4. The controller includes a base 70 on which a plurality of upright blocks 72A through 72D are mounted. Between adjacent ones of the blocks 72, spools 74A through 74C are tangentially mounted on shafts 76A through 76C, respectively. The shafts 76 are axially aligned with each other, and are rotatably mounted between the blocks 72. The spools 74 are generally cylindrical and are positioned tangentially to the shafts 76.

The strand 12 extends through axial bores in the shafts 76 and is wrapped about each of the spools 74 to form three coils 78A through 78C. The radii of the coil 78 are such that the fiber 12 is stressed to form a birefringent medium in each of the coils 78. The three coils 78A through 78C may be rotated independently of each other about the axis of the shafts 74A through 74C respectively to adjust the birefringence of the fiber 12 and, thus, to control the polarization of the light passing through the fiber 12.

The diameter and number of turns in the coils 78 are such that the outer coils 78A and C provide a spatial delay of one-quarter wave length, while the central coil 78D provides a spatial delay of one-half wave length. The quarter wave length coils 78A and C control the elipticity of the polarization, and the half wave length coil 78 controls the direction of polarization. This provides a full range of adjustment of the polarization of the light propagating through the fiber 12.

It will be understood, however, that the polarization controller may be modified to provide only the two quarter wave coils 78A and C, since the direction of polarization (otherwise provided by the central coil 78B) may be controlled indirectly through proper adjustment of the elipticity of polarization by means of the two quarter wave coils 78A and C. Accordingly, the polarization controllers 24 and 36 are shown in FIG. 1 as including only the two quarter wave coils 78A and C. Since this configuration reduces the overall size of the controllers 24-36, it may be advantageous for certain applications of the present invention involving space limitations.

Thus, the polarization controllers 24 and 36 provide means for establishing, maintaining and controlling the polarization of both the applied light and the counter-propagating waves.

Operation Without Phase Modulation Or Polarization Control

Figure 5:
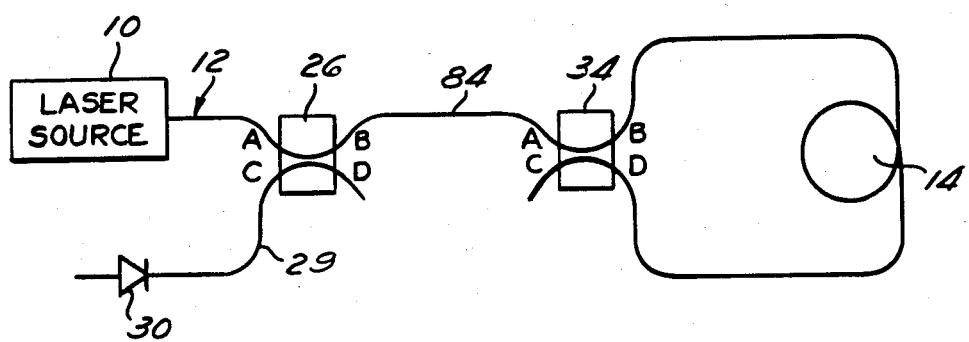
FIG. 5 is a schematic diagram of the rotation sensor of FIG. 1 with the polarizer, polarization controllers, and phase modulator removed therefrom.

In order to fully understand the function and importance of the polarizer 32 (FIG. 1) and phase modulator 38, the operation of the rotation sensor will first be described as if these components had been removed from the system. Accordingly FIG. 5 shows the rotation sensor of FIG. 1 in schematic block diagram form, with the modulator 38, polarizer 32, and associated components removed therefrom.

Light is coupled from the laser source 10 to the fiber 12 for propagation therein. The light enters port A of the coupler 26, where a portion of the light is lost through port D. The remaining portion of the light propagates from port B to port A of the coupler 34, where it is split into two counter-propagating waves W1, W2 of equal amplitude. The wave W1 propagates from the port B in a clockwise direction about the loop 14, while the wave W2 propagates from port D in a counter-clockwise direction around the loop 14.

After the waves W1, W2 have traversed the loop 14, they are recombined by the coupler 34 to form an optical output signal, which propagates from port A of the coupler 34 to port B of the coupler 26. A portion of the optical output signal is coupled from port B to port C of the coupler 26 for propagation along the fiber 29 to the photodetector 30. This photodetector 30 outputs an electrical signal which is proportional to the intensity of the light impressed thereon by the optical output signal.

The intensity of the optical output signal will vary in accordance with the amount and type, i.e., constructive or destructive, of interference between the waves W1, W2 when they are recombined or interfered at the coupler 34. Ignoring, for the moment, the effects of fiber birefringence, the waves W1, W2 travel the same optical path around the loop 14. Thus, assuming the loop 14 is at rest, when the waves W1, W2 are recombined at the coupler 34, they will interfere constructively, with no phase difference therebetween, and the intensity of the optical output signal will be at a maximum. However, when the loop 14 is rotated, the counter-propagating waves W1, W2, will be shifted in phase in accordance with the Sagnac effect, so that when they are superposed at the coupler 34, they destructively interfere to reduce the intensity of the optical output signal. Such Sagnac phase difference between the waves W1, W2, caused by rotation of the loop 14, is defined by the following relationship:

$$\Delta\phi_R = \frac{8\pi NA}{\lambda c} \Omega \tag{1}$$

where:
A is the area bounded by the loop 14 of optical fiber;
N is the number of turns of the optical fiber about the area A;
$\Omega$ is the angular velocity of the loop about an axis which is perpendicular to the plane of the loop; and
$\lambda$ and c are the free space values of the wave length and velocity, respectively, of the light applied to the loop.

The intensity of the optical output signal ($I_T$) is a function of the Sagnac phase difference ($\Delta\phi_R$) between the waves W1, W2, and is defined by the following equation:

$$I_T = I_1 + I_2 + 2\sqrt{I_1 I_2} \cos(\Delta\phi_R) \tag{2}$$

where $I_1$ and $I_2$ are the individual intensities of the waves W1, W2, respectively.

From equations (1) and (2) it may be seen that the intensity of optical output signal is a function of the rotation rate ($\Omega$). Thus, an indication of such rotation rate may be obtained by measuring the intensity of the optical output signal, utilizing the detector 30.

Figure 6:
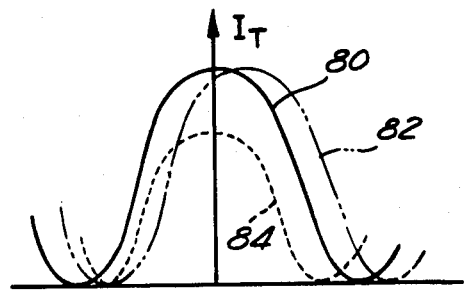
FIG. 6 is a graph of the intensity of the optical output signal, as measured by the photodetector, as a function of the rotationally induced Sagnac phase difference, illustrating the effects of birefringence induced phase differences and birefringence induced amplitude fluctuations.

FIG. 6 shows a curve 80, which illustrates this relationship between the intensity of the optical output signal ($I_T$) and the Sagnac phase difference ($\Delta\phi_R$) between the counter-propagating waves W1, W2. The curve 80 has the shape of a cosine curve, and the intensity of the optical output signal is at a maximum when the Sagnac phase difference is zero. Where the phase difference between the counter-propagating waves W1, W2 is caused entirely by rotation of the loop 14, the curve 80 will vary symmetrically about the vertical axis. However, as discussed in copending patent application Ser. No. 288,212, entitled "Fiber Optic Rotation Sensor Utilizing Unpolarized Light" and filed July 29, 1981, with polarized light an additional, non-reciprocal, phase difference between the counter-propagating waves W1, W2 may be caused by the residual birefringence of the optical fiber 12. This application is hereby incorporated herein by reference. This additional non-reciprocal phase difference will not occur if completely unpolarized light is used.

Birefringence induced phase differences occur because light traveling in each of the two polarization modes of the single mode fiber 12 travels at a different velocity. Birefringence will cause coupling of part of the light traveling in one polarization mode into the other mode. This creates a non-rotationally induced phase difference between the waves W1, W2, which causes the waves W1, W2 to interfere in a manner that distorts or shifts the curve 80 of FIG. 6. Such a shift is illustrated by the curve 82, shown in phantom lines in FIG. 6.

Such birefringence induced, non-reciprocal phase difference is indistinguishable from a rotationally induced Sagnac phase difference, and is dependent on environmental factors which vary fiber birefringence, such as temperature and pressure. Thus, fiber birefringence is the cause of a major source of error in fiber optic rotation sensors.

Operation With the Polarizer 32

The problem of non-reciprocal operation due to fiber birefringence is solved in the rotation sensor of the present invention by means of the polarizer 32 (FIG. 1) which, as discussed above, permits utilization of only a single polarization mode. When the polarizer 32 is introduced into the system at the point designated by the reference numeral 84 in FIG. 5, light passing through the polarizer 32 propagates into the loop 14 in one selected polarization mode. Further, when the counter-propagating waves are recombined to form the optical output signal, any light that is not of the same polarization as the light applied to the loop is prevented from reaching the photodetector 30, since the optical output signal passes through the polarizer 32. Thus, the optical output signal, as it travels from port A of coupler 34 to port B of coupler 26, will have precisely the same polarization as the light applied to the loop.

Therefore, by passing the input light and optical output signal through the same polarizer 32, only a single optical path is utilized, thereby eliminating the problem of birefringence induced phase difference caused by the different velocities of propagation in the two possible polarization modes. That is, by filtering out all light which is transferred from the selected mode to the unselected mode by the birefringence in the fiber, it is possible to eliminate all light waves in the unselected mode which might gain or lose phase relative to the selected mode because of the different velocity of propagation. Further, it should be noted that the polarization controllers 24, 36 (FIG. 1) may be used to adjust the polarization of the applied light, and optical output signal, respectively, to reduce optical power loss at the polarizer 32, and thus, maximize the signal intensity at the detector 30.

Operation With the Phase Modulator 38

Referring again to FIG. 6, it will be seen that, because the curve 80 is a cosine function, the intensity of the optical output signal is nonlinear for small Sagnac phase differences ($\Delta\phi_R$) between the waves W1, W2. Further, the optical output signal intensity is relatively insensitive to changes in phase difference, for small values of $\Delta\phi_R$ Such nonlinearity and insensitivity makes it difficult to transform the optical intensity ($I_T$) measured by detector 30 into a signal indicative of the rate of rotation of the loop 14 (via equation 1).

Further, although birefringence induced phase differences between the waves W1, W2 are eliminated, as discussed above by use of the polarizer 32, nevertheless cross coupling between polarization modes caused by fiber birefringence occurs. This cross coupling reduces the optical intensity of the optical output signal since the cross coupled light is prevented from reaching the photodetector 30 on the polarizer 32. Thus, changes in fiber birefringence cause the amplitude of the curve 80 of FIG. 6 to vary, for example, as illustrated by the curve 84. It will be understood that curves 80, 82, 84 of FIG. 6 are not drawn to scale.

The foregoing problems are solved by means of a synchronous detection system utilizing the phase modulator 38, signal generator 40 and lock-in amplifier 46 shown in FIG. 1.

Figure 7:
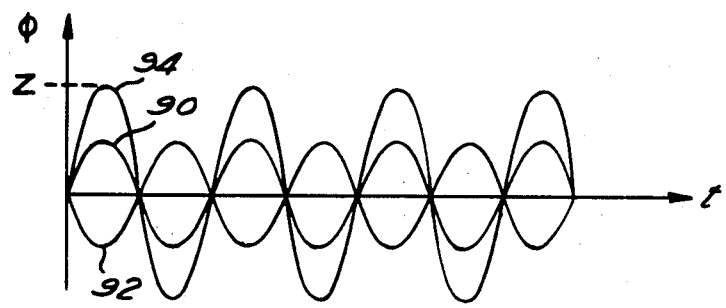
FIG. 7 is a graph of phase difference as a function of time showing the phase modulation of each of the counter-propagating waves and the phase difference between the counter-propagating waves.

Referring to FIG. 7, the phase modulator 38 modulates the phase of each of the propagating waves W1, W2 at the frequency of the signal generator 40. However, as may be seen from FIG. 1, the phase modulator 38 is located at one end of the loop 14. Thus, the modulation of the wave W1 is not necessarily in phase with the modulation of the wave W2. Indeed, it is preferable for proper operation of this synchronous detection system that the modulation of the waves W1, W2 be 180° out of phase. Referring to FIG. 7, it is preferable that the modulation of the wave W1, represented by the sinusoidal curve 90, by 180° out of phase with the modulation of the wave W2, represented by the curve 92. Use of a modulation frequency which provides such 180° phase difference between the modulation of the wave W1 relative to that of W2 is particularly advantageous in that it eliminates modulator induced amplitude modulation in the optical output signal measured by the detector 30. This modulation frequency ($f_m$) may be calculated using the following equation:

$$f_m = \frac{c}{2n_{eq}L} \quad (3)$$

where:
L is the differential fiber length between the coupler 34 and the modulator 38 for the counter-propagating waves W1, W2, i.e., the distance, measured along the fiber, between the modulator 38 and a symmetrical point on the other side of the loop 14;
$n_{eq}$ is the equivalent refractive index for the single mode fiber 12; and
c is the free space velocity of the light applied to the loop 14.

At this modulation frequency ($f_m$) which is called the "proper" frequency, the phase difference ($\Delta\phi_1$) between the counter-propagating waves W1, W2, stemming from phase modulation of these waves in accordance with the curves 90 and 92, is illustrated by the sinusoidal curve 94 in FIG. 7. The curve 94 is obtained by subtracting the curve 92 from the curve 90 to obtain the phase difference between W1 and W2. This modulation of the phase difference between the waves W1, W2 will also modulate the intensity ($I_T$) of the optical output signal in accordance with the curve 80 of FIG. 6 just as a Sagnac phase shift would, since such phase modulation $\Delta\phi_1$ is indistinguishable from rotationally induced Sagnac phase differences $\Delta\phi_R$.

Figure 8:
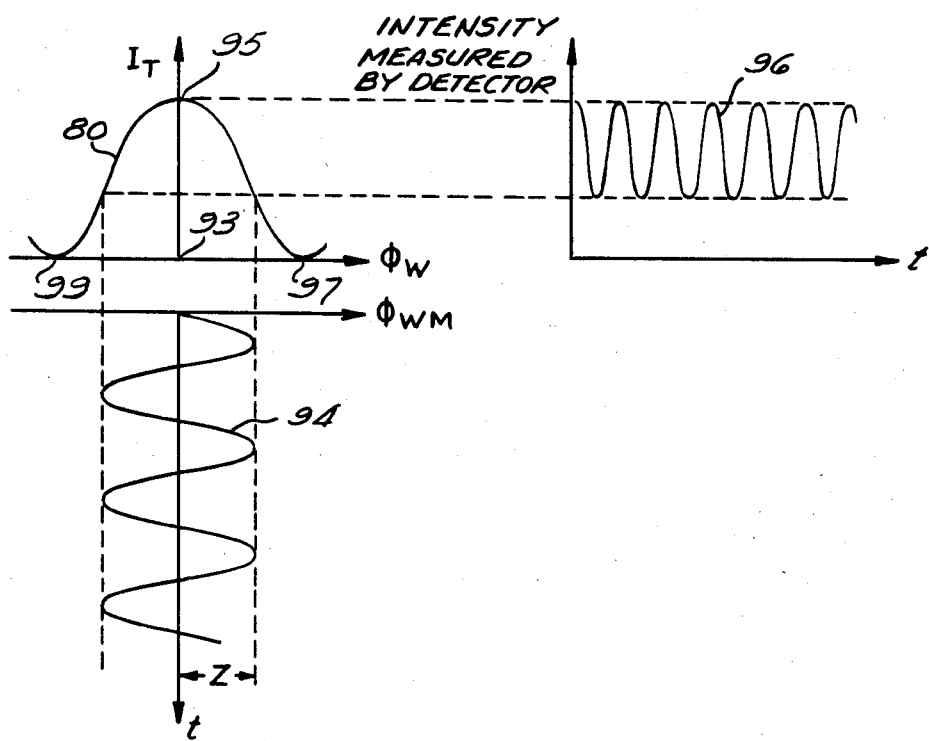
FIG. 8 is a schematic drawing illustrating the effect of the phase modulation upon the intensity of the optical output signal, as measured by the detector, when the loop is at rest.
Figure 9:
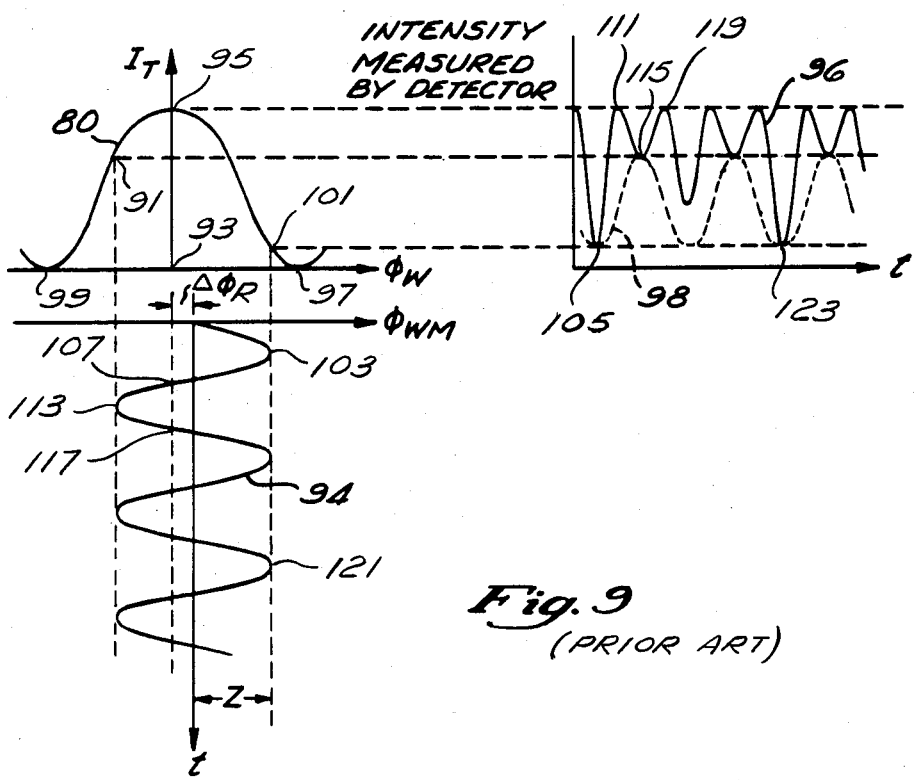
FIG. 9 is a schematic drawing showing the effect of the phase modulation upon the intensity of the optical output signal as measured by the detector when the loop is rotating.

The foregoing may be understood more fully through reference to FIGS. 8 and 9 which graphically illustrate the effect of (a) the phase modulation $\Delta\phi_1$, defined by the curve 94 of FIG. 7, and (b) the Sagnac phase difference $\Delta\phi_R$, upon the intensity ($I_T$) of the optical output signal. Before proceeding with a discussion of FIGS. 8 and 9, it should first be understood that the intensity ($I_T$) of the modulated optical output signal is a function of the total phase difference between the waves W1, W2. Such total phase difference is comprised of both the rotationally induced Sagnac phase difference $\Delta\phi_R$ and the time varying modulation induced phase difference $\Delta\phi_1$. The total phase difference $\Delta\phi$ between the waves W1, W2 may be expressed as follows:

$$\Delta\phi = \Delta\phi_R + \Delta\phi_1 \quad (4)$$

Accordingly, since the effects of the modulation induced phase difference $\Delta\phi_1$, as well as the rotationally induced phase difference $\Delta\phi_R$ will be considered in reference to FIGS. 8 and 9, the horizontal axis for the curve 80 has been relabeled as $\Delta\phi$ to indicate that the total phase difference is being considered, rather than only the rotationally induced phase difference, as in FIG. 6.

Referring now to FIG. 8, the effect of the phase modulation $\Delta\phi_1$ (curve 94) upon the intensity $I_T$ of the optical output signal will be discussed. Curve 80 represents the relationship between the intensity of the optical output signal resulting from two interfering coherent waves to the phase difference $\Delta\phi$ between the waves. When the relative phase angle between them is zero, as illustrated at 93, the resultant intensity of the combined wave is a maximum, as illustrated at 95. When the relative phase between the waves W1 and W2 is nonzero, the combined optical signal will have a lower intensity depending upon the magnitude of the phase difference $\Delta\phi$. The intensity continues to decrease with increasing $\Delta\phi$ until the relative phase difference is either plus or minus 180°, as illustrated at 97 and 99 respectively. At a phase difference of plus or minus 180°, the two counter-propagating waves completely destructively interfere, and the resultant intensity is zero as illustrated at 97 and 99.

In FIG. 8, it is assumed that the loop 14 is at rest, and thus, the optical signal is not affected by the Sagnac effect. Specifically, it may be seen that the modulation induced phase difference curve 94 causes the optical output signal to vary as illustrated by the curve 96. The curve 96 is obtained by translating the points on the curve 94, representing the instantaneous phase difference $\Delta\phi_1$ between W1 and W2 onto the curve 80 representing the resultant optical intensity for a phase difference of that magnitude. When all the points on the curve 94 are translated onto the curve 80, and the corresponding intensities are plotted, the curve 96 results. The translation of the curve 94 through the curve 80 is symmetrical about the vertical axis of the curve 80, so that the optical intensity measured by the detector 30 varies periodically at a frequency equal to the second harmonic of the modulating frequency, as shown by the curve 96.

Since, as discussed above, the lock-in amplifier 46 is tuned by the reference signal at the modulation frequency $f_m$ from the signal generator 40 (FIG. 1), the lock-in amplifier synchronously detects only the detector output signal at the modulation frequency $f_m$, i.e., first harmonic, of the modulator 38. But since the detector output signal is at the second harmonic of the modulation frequency, as shown by the curve 96, the output signal from the amplifier 46 will be zero and the display 47 will indicate a rotation rate of zero.

It should be noted that even if birefringence induced amplitude fluctuations occur in the optical output signal, as discussed in reference to the curve 84 of FIG. 6, the curve 96 of FIG. 8 will remain at a second harmonic frequency. Thus, such birefringence induced amplitude fluctuations will not affect the amplifier 46 output signal. The detection system thus far described therefore provides a substantially more stable operating point that is insensitive to changes in birefringence.

When the loop 14 is rotated, the counter-propagating waves W1, W2 are shifted in phase, as discussed above, in accordance with the Sagnac effect. The Sagnac phase shift provides a constant phase difference $\Delta\phi_R$ for a constant rotational velocity. This Sagnac phase shift adds to the phase difference $\Delta\phi_1$ created by the modulator 38, so that the entire curve 94 is translated in phase from the position shown in FIG. 8, by an amount equal to $\Delta\phi_R$, as shown in FIG. 9. This causes the optical output signal to vary nonsymmetrically along the curve 80 between the points 99 and 101. This causes an optical output signal as illustrated by curve 96.

The points on the curve 96 are derived as follows. The combined phase difference, illustrated at 103 on curve 94, translates through the point 101 on the curve 80 to the point 105 on the curve 96. The point 107 on the curve 94 translates through the point 95 on the curve 80 to a point 111 on the curve 96. Likewise, the point 113 translates through the point 91 to the point 115, and the point 117 translates through the point 95 to the point 119. Finally, the point 121 translates through the point 101 to the point 123.

The optical output signal 96 has a first harmonic component as illustrated in phantom lines of the sinusoidal curve 98. The peak amplitude of the first harmonic component 98 need not, however, exactly match the amplitude of the optical output signal at point 115 although it might in some cases.

It will be seen subsequently that the RMS value of this sinusoidal curve 98 is proportional to the sine of the rotationally induced Sagnac phase difference $\Delta\phi_R$. Since the amplifier 46 synchronously detects signals having the fundamental frequency of the modulator 38, the amplifier 46 will output a signal that is proportional to the RMS value of the curve 96. This signal can be used to indicate the rotation rate of the loop.

The drawings of FIG. 9 illustrate the intensity waveform of the optical output signal for one direction of rotation (e.g., clockwise) of the loop 14. However, it will be understood that, if the loop 14 is rotated in the opposite direction (e.g., counter-clockwise) at an equal velocity, the intensity waveform 96 of the optical output signal will be exactly the same as illustrated in FIG. 9, except that it will be translated so that the curve 98 is shifted 180° from the position shown in FIG. 9.

The lock-in amplifier 46 detects this 180° phase difference for the curve 98, by comparing the phase of the first harmonic 98 with the phase of the reference signal from the signal generator 40, to determine whether the rotation of the loop is clockwise or counter-clockwise. Depending on the direction of rotation, the amplifier 46 outputs either a positive or negative signal to the display 47. However, regardless of the direction of rotation, the magnitude of the signal is the same for equal rates of rotation of the loop 14.

Figure 10:
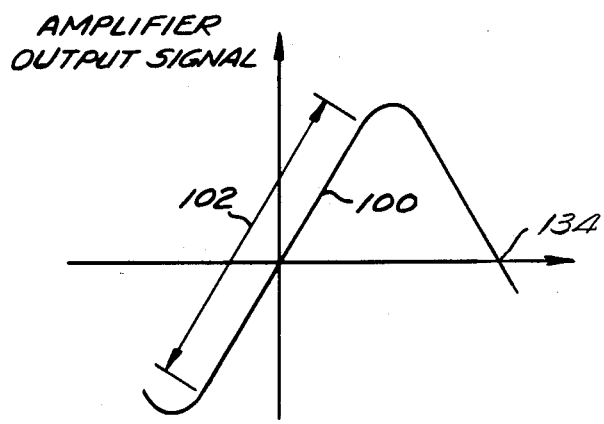
FIG. 10 is a graph of the amplifier output signal as a function of the rotationally induced Sagnac phase difference, illustrating an operating range for the rotation sensor of FIG. 1.

The waveform of the amplifier output signal is shown in FIG. 10 as the curve 100. It will be seen that this curve 100 is sinusoidal and varies positively or negatively from the zero rotation rate output voltage, illustrated at 125, depending on whether the rotation of the loop 14 is clockwise or counter-clockwise. Further, the curve 100 has a substantially linear portion 102 which varies symmetrically about the origin and provides a relatively wide operating range for measuring rotation. Moreover, the slope of the curve 100 provides excellent sensitivity through its linear operating range 102 to small Sagnac phase shifts.

Thus, by utilizing the synchronous detection system, the above-described problems of nonlinearity, insensitivity to small Sagnac phase shifts, and birefringence induced amplitude fluctuations are reduced or eliminated for rotation rates of the loop 14 which keep the points 91 and 101 in FIG. 9 somewhere on the curve 80 between the points 97 and 99.

A further advantage of the detection system thus far disclosed relates to the fact that state of the art phase modulators, such as the modulator 38, induce amplitude modulation in the optical output signal, either directly or indirectly, through polarization modulation, i.e., the phase modulator also shifts some of the light passing therethrough to the unselected polarization mode. However, it will be recalled from the discussion in reference to Equation (3) that, by operating at a specific or "proper" frequency at which the phase difference between the modulation of the waves W1 and W2 is 180°, the odd harmonic frequency components of this amplitude modulation, that are induced in each of the counterpropagating waves W1, W2 by the modulator 38, cancel each other when the waves are superposed to form the optical output signal. Thus, since the above-described detection system detects only an odd harmonic, i.e., the fundamental frequency, of the optical output signal, the effects of the undesired amplitude modulation are eliminated. Therefore, by operating at the specific frequency defined by Equation (3), and by detecting only an odd harmonic of the optical output signal, the rotation sensor of the present invention may operate independently of modulator induced amplitude and polarization modulation.

A further benefit of operating at the proper frequency is that even harmonics of the phase modulation, induced by the modulator 38 in each of the counter-propagating phase W1, W2, cancel when these waves are superposed to form the optical output signal. Since these even harmonics may, by superposition, produce spurious odd harmonics in the optical signal which might otherwise be detected by the detection system, their elimination improves the accuracy of rotation sensing.

In addition to operating the phase modulator 38 at the frequency defined by Equation (3), it is also preferable to adjust the magnitude of the phase modulation so that the amplitude of the detected first harmonic of the optical output signal intensity is maximized, since this provides improved rotation sensing sensitivity and accuracy. It has been found that the first harmonic of the optical output signal intensity is at the maximum, for a given rotation rate, when the amplitude of the modulator induced phase difference $\Delta\phi_1$ between the waves W1, W2, indicated by the dimension labeled Z in FIGS. 7, 8, and 9, is 1.84 radians. This may be understood more fully through reference to the following equation for the total intensity ($I_T$) of two superposed waves being individual intensities of $I_1$ and $I_2$, respectively, with a phase difference $\Delta\phi$ therebetween.

$$I_T = I_1 + I_2 + 2\sqrt{I_1 I_2} \cos(\Delta\phi) \quad (5)$$

where:

$$\Delta\phi = \Delta\phi_R + \Delta\phi_1 \quad (6)$$

and $$\Delta\phi_1 = Z \sin(2\pi f_m t). \quad (7)$$

Thus, $$\Delta\phi = \Delta\phi_R + Z \sin(2\pi f_m t) \quad (8)$$

The Fourier expansion of cosine ($\Delta\phi$) is:

$$\cos \Delta\phi = \cos(\Delta\phi_R)\left\{ J_0(z) + 2 \sum_{n=1}^{\infty} J_{2n}(z)\cos[2\pi(2nf_m t)] \right\} + \sin(\Delta\phi_R)\left\{ 2 \sum_{n=1}^{\infty} J_{2n-1}(z)\sin[2\pi(2n-1)f_m t] \right\} \quad (9)$$

where $J_n(z)$ is the $n^{th}$ Bessel function of the variable z, and z is the peak amplitude of the modulator induced phase difference between the waves W1, W2.

Therefore, detecting only the first harmonic of $I_T$ yields:

$$I_{T(1)} = 4\sqrt{I_1 I_2} \, J_1(z)\sin(\Delta\phi_R) \sin(2\pi f_m t) \quad (10)$$

Thus, the amplitude of the first harmonic of the optical output signal intensity is dependent upon the value of the first Bessel function $J_1(z)$. Since $J_1(z)$ is a maximum when z equals 1.84 radians, the amplitude of the phase modulation should preferably be selected so that the magnitude (z) of the modulator induced phase difference $\Delta\phi_1$ between the waves W1, W2 is 1.84 radians.

Reducing the Effects of Backscatter

As is well known, present state-of-the-art optical fibers are not optically perfect, but have imperfections such as density fluctuations in the basic material of the fiber. These imperfections cause variations in the refractive index of the fiber which causes scattering of small amounts of light. This phenomena is commonly referred to as Rayleigh scattering. Although such scattering causes some light to be lost from the fiber, the amount of such loss is relatively small, and therefore, is not a major concern.

The principal problem associated with Rayleigh scattering relates not to scattered light which is lost, but rather to light which is reflected so that it propagates through the fiber in a direction opposite to its original direction of propagation. This is commonly referred to as "backscattered" light. Since such backscattered light is coherent with the light comprising the counter-propagating waves W1, W2, it can constructively or destructively interfere with such propagating waves, and thereby cause variation in the intensity of the optical output signal, as measured by the detector 30.

The portion of backscattered light from one wave which will be coherent with the counter-propagating wave is that which is scattered within a coherence length of the center of the loop 14. Thus, by reducing the coherence length of the source, the coherence between the backscattered light and the counter-propagating waves is reduced. The remaining portion of the backscattered light will be incoherent with the counter-propagating wave, and thus, the interference therebetween will vary randomly so that it is averaged. Therefore, this incoherent portion of the backscattered light will be of substantially constant intensity, and consequently, it will not cause significant variations in the intensity of the optical output signal.

Accordingly, in the present invention, the effects of backscatter are reduced by utilizing as the light source 10, a laser having a relatively short coherence length, for example, one meter or less. By way of specific example, the light source 10 may comprise the model GO-DIP laser-diode, commercially available from General Optronics Corp., as mentioned above.

An alternative method of prohibiting destructive or constructive interference between the backscattered waves and the propagating waves involves the inclusion of an additional phase modulator in the system at the center of the fiber loop 14. This phase modulator is not synchronized with the modulator 38.

The propagating waves will pass through this additional phase modulator one time only, on their travel around the loop. For backscatter which occurs from a propagating wave before the wave reaches the additional modulator, the backscatter will not be phase modulated by this additional modulator, since neither its source propagating wave nor the backscatter itself has passed through the additional modulator.

On the other hand, for backscatter which occurs from a propagating wave after the wave passes through this additional phase modulator, the backscatter will be effectively twice phase modulated, once when the propagating wave passed through the additional phase modulator, and once when the backscatter passed through the additional modulator.

Thus, if the additional phase modulator introduces a phase shift of $\phi(t)$, the backscattered wave originating at any point except at the center of the loop 14 will have a phase shift of either zero, or $2\phi(t)$, either of which is time varying with respect to the $\phi(t)$ phase shift for the propagating wave. This time varying interference will average out over time, effectively eliminating the effects of the backscatter.

In yet another alternative method of prohibiting destructive or constructive interference from backscatter, the additional phase modulator, not synchronized with the modulator 38, may be introduced at the output of the light source 10.

In this case, backscatter occurring at any point other than the center of the loop 14 will have a different optical path length from the light source 10 to the detector 30 than does the propagating wave from which the backscatter originated.

Thus, the propagating wave will traverse the loop 14 one time, while the backscattered wave and the propagating wave from which it originated will have traversed a portion of the loop 14 twice. If this portion is not one-half of the loop, the path lengths differ.

Because the path lengths differ, a propagating wave which reaches the detector 30 will have been generated at the source 10 at a different time than a backscattered wave which reaches the detector 30 simultaneously.

The phase shift introduced by the additional phase modulator at the source 10 introduced a phase shift $\phi(t)$ relative to the propagating wave, but a phase shift of $\phi(t+K)$ to the backscattered wave, where K is the time difference between the passage of the waves through the modulator. Since $\phi(t+K)$ is time varying with respect to $\phi(t)$, the backscattered interference will average out over time, effectively eliminating the effects of the backscatter.

Extended Dynamic Range Detection System Using A Gated Wave

The detection system described above with reference to FIGS. 1-10 is a very effective rotation sensing system within a certain range of rotational velocities for the loop 14. However, the dynamic range is limited by certain phenomena. Referring to FIG. 9, it can be seen that the curve 80 is periodic. Therefore, if a large rotation rate causes a large enough $\Delta\phi_R$ to move the curve 94 past either the point 97 or the point 99, then the function 96 could repeat itself for a second, higher rotation rate. This second rotation rate would be substantially greater than the rotation rate which caused the Sagnac phase shift $\Delta\phi_R$ depicted in FIG. 9, but would be indistinguishable from the lower velocity using the output optical signal 96. That is, if the $\Delta\phi_R$ from some larger rotational velocity were sufficiently large to move the curve 94 so as to operate between two new points 99' and 101' on the second lobe of the curve 80, then the output optical signal 96 would be indistinguishable in such a case from the case shown where the curve 94 operates between the points 91 and 101.

The present invention comprises a novel method, and associated apparatus, for extending the range of detection of optical fiber gyroscopes. In performing this method, the optical fiber gyroscope described above is modified to include modulation of the counter-propagating light waves at an additional frequency level ($f_m$) which is much lower than the "proper" frequency or bias frequency ($f_b$) described above by Equation 3.

With the reciprocal phase modulator located asymmetrically in the sensing loop, the application of a signal to that modulator can produce a differential shift $\Delta\phi_c$ between the phases of the two counter-propagating waves in the loop. This $\Delta\phi_c$ is time varying at the modulation frequency $f_c$, and contains no DC term because the phase shift produced by the modulator in one half of its modulation cycle is cancelled by that produced in the next half cycle.

In contrast, the differential phase shift $\Delta\phi_R$ which is caused by rotation can be a DC quantity and, thus, $\Delta\phi_c$ cannot be used to directly null out $\Delta\phi_R$. However, if the gyroscope is gated off during every other half cycle of the modulation waveform, the average $\Delta\phi_c$ produced in the remaining half cycles can be used to directly null out the rotation produced signal in those same half cycles. By monitoring the amplitude of the signal which produces the $\Delta\phi_c$ during the gated-on half cycles, it is possible to determine the rotation rate of the sensor.

With a bias frequency $f_b$ for biasing the operating point, as described above, by imposing an additional modulation frequency $f_m$ which is much lower than the bias phase modulation frequency, and then by gating the gyro off during every other half cycle of the $f_m$ waveform, a phase difference modulation waveform is produced whose time average value has a net DC level. By adjusting the amplitude of the second phase modulation at frequency $f_m$, this time average DC value of the phase difference modulation may be adjusted to effectively null out the $\Delta\phi_R$ produced in those same half cycles. The technique described above functions to effectively null out the effects of rotation on the output signal since no rotation is identified during the period of time in which the gated signal is off, and the effects of $\Delta\phi_R$ are cancelled by the phase modulation at frequency $f_m$ when the gated signal is on. Since the amount of rotation is proportional to the amplitude of phase difference modulation at $f_m$ which was necessary in order to null out the influence of $\Delta\phi_R$, the rotation rate may be determined by monitoring the amplitude of the second modulation signal. This method will be described in more detail below, in conjunction with a description of the apparatus utilized in practicing the method.

Figure 11:
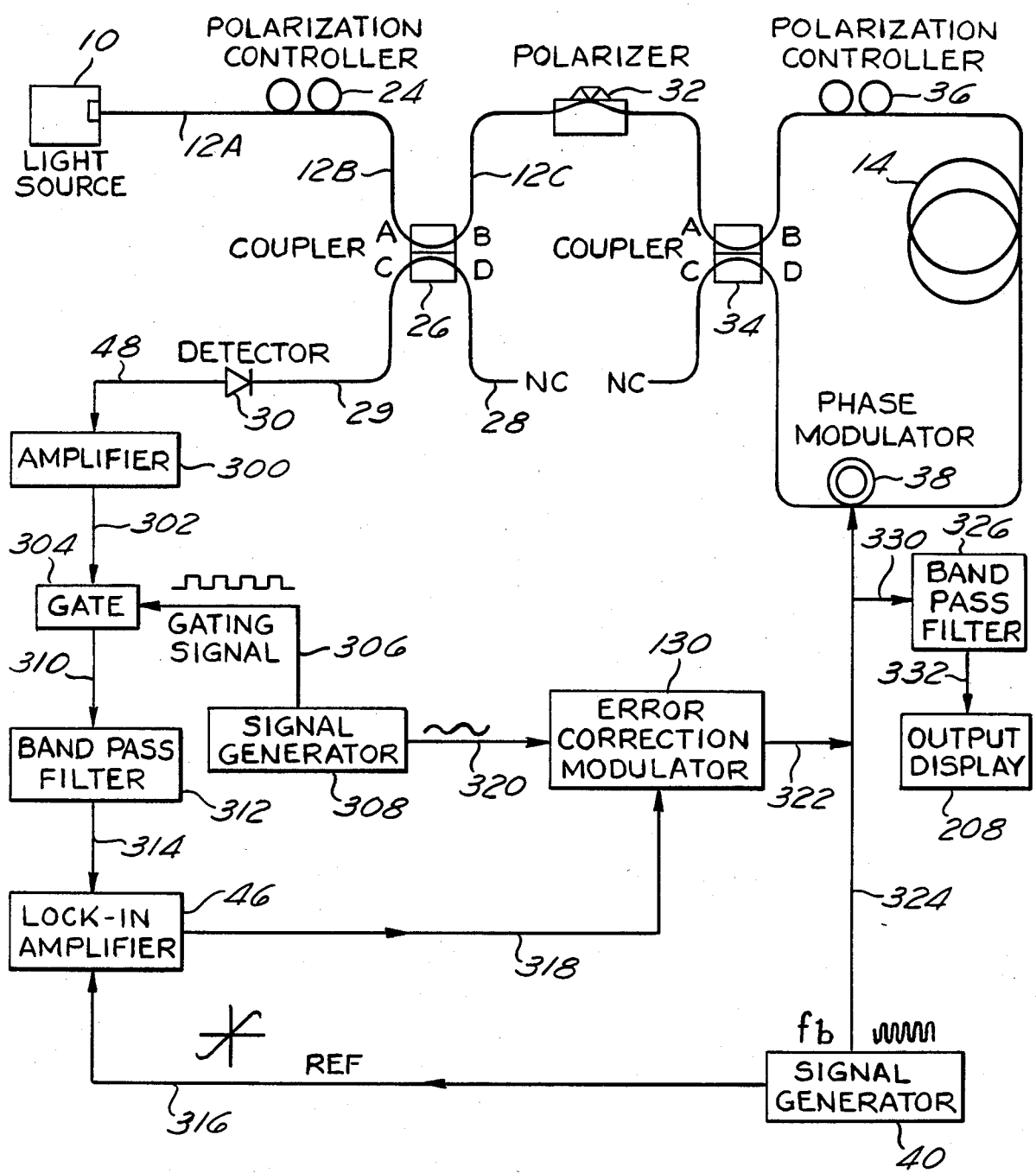
FIG. 11 is a diagram of one preferred embodiment of a gated closed loop rotation sensor with extended dynamic range.

Referring to FIG. 11, one preferred embodiment of a device is seen which, when used in conjunction with the method described herein, provides a significant increase in the range of detection, as well as an improvement in the reliability of the results provided by such detection. The detection system of FIG. 11 embodies many of the components of the system illustrated in FIG. 1. Thus, for purposes of simplicity, those components of FIGS. 1 and 11 which have the same structure and function have been assigned corresponding numbers.

In the circuit of FIG. 11, the optical output signal from detector 30 is transmitted via line 48 through an amplifier 300, where its intensity is magnified sufficiently to be useable in the electronic circuitry. From amplifier 300, the output signal passes on line 302 to a conventional electronic gate 304. Operation of gate 304 is controlled by a gating signal received through line 306 from an ac signal generator 308. The phase of the signal on line 306 may be adjusted by use of conventional phase delaying devices in line 306.

Signal generator 308 produces a second phase modulation signal at a frequency $f_m$ which may be arbitrarily selected, but which should be much lower than that of the bias phase modulation which is typically set, as described previously, at the "proper" frequency, $f_p$.

The signal from gate 304 is synchronously gated onto line 310 at the second phase modulation frequency $f_m$ produced in signal generator 308. The signal is then transmitted into a band pass filter 312 which passes onto line 314 only the $f_b$ frequency component of the signal received from line 310. In the absence of any other signals to alter its magnitude, the signal at frequency $f_b$ on line 314 is representative of the amount of rotation experienced by loop 14.

As described below, the signal on line 314 is utilized in conjunction with the lock-in amplifier 46 to produce a feedback signal which controls the amplitude of the second phase modulation at frequency $f_m$. With proper amplitude adjustment of this second phase difference modulation, a signal may be generated which causes the phase modulator 38 to influence the counter-propagating waves in the loop such that, on a time averaged basis, the signal at frequency $f_b$ on line 314 is driven towards zero, regardless of the loop rotation rate.

In order to produce the feedback signal described above, the signal on line 314 is transmitted to lock-in amplifier 46. In addition, the lock-in amplifier receives a reference signal from line 316 which corresponds to the bias modulation frequency $f_b$ produced by ac signal generator 40. Generally, this frequency $f_b$ corresponds to the "proper" frequency as calculated previously using equation (3).

In response to the signals received from lines 314 and 316, lock-in amplifier 46 generates an "error signal" which is proportional to the amplitude of the input signal from line 314 and which matches the frequency of the reference signal from line 316. This error signal will lie somewhere on the curve 100 of FIG. 10. In this particular case, the error signal will be some DC level on the curve 100 for a fixed rotation rate resulting in a fixed amplitude of the first harmonic component on the input line 48. If the amplitude of the first harmonic component changes, the DC level of the error signal will change as the operating point shifts along the curve 100.

As explained previously, without the second phase modulation at frequency fm, the curve 100 is periodic because the curve 80 in FIG. 9 is periodic. Therefore, the magnitude of the $f_b$ frequency component of the optical output signal 96 will vary periodically as increasing Sagnac phase shifts push the total phase shift curve 94 out into other lobes of the curve 80. That is, the point 134 (FIG. 10) on the curve 100 represents a situation where the Sagnac phase shift has pushed the curve 94 out far enough so that maxima and minima of the total resultant phase shift curve translate through symmetrically balanced points on the second lobe of the curve 80. The resultant output waveform 96 would look like the output optical signal 96 depicted in FIG. 8 for the zero rotation rate case and would have no first harmonic component. Because the waveform 96 has no first harmonic component in this situation, the output of the lock-in amplifier would be zero despite the fact that the rotation rate is non-zero.

The detection system of the present invention solves this problem through use of the feed back error signal, by adjusting the amplitude of the second phase modulation signal at frequency $f_m$ in response to changes in the first harmonic signal on line 314. The adjusted second phase modulation signal is then utilized, as described below, to adjust the phase modulation of the counter propagating waves in the loop so that the signal at frequency $f_b$ on line 314 is effectively cancelled. As a result, even though the rotation is such that the Sagnac phase shift is pushed to the point 134 on curve 100, FIG. 10, the amplitude of the second phase modulation signal provides a ready indication of the actual rotation rate at high velocities which, without such feedback, would place the curve 94 beyond the point represented by 134 of FIG. 10.

The function of adjusting the amplitude of the second phase modulation signal in response to the feedback error signal is performed by the error correction modulator 130. To accomplish this, the error correction modulator 130 receives an error signal from lock-in amplifier 46 via line 318 and also receives the second modulation signal from signal generator 308 on line 320. Preferably, the second modulation signal defines a sinusoidal waveform.

Upon receiving a non-zero error signal on line 318, the error correction modulator 130 increases or decreases the amplitude of the second phase modulation signal in response to the magnitude and sign of the error signal in order to reduce the magnitude of the error signal on the line 318 to zero, or to within a predetermined range of zero. When the predetermined level for the error signal on line 318 is reached, the modulator 130 maintains the amplitude of the second phase modulation signal until the error signal again changes.

Upon detecting a change in the error signal, the modulator 130 again changes the amplitude of the second phase modulation signal until the error signal on the line 318 is again reduced to zero or to within a predetermined range of zero. The adjusted second phase modulation signal is transmitted from the error correction modulator 130 onto line 322. The feedback approach described herein can also be applied to other types of gyroscopes, such as ones which are made of high birefringent fiber.

The adjusted second phase modulation signal on line 322 is combined with the bias modulation signal from signal generator 40 on line 324. This combined signal from line 324 is applied to phase modulator 38 so as to influence the counter propagating waves and, consequently, the output signal from detector 30, in accordance with the method described above. Thus, the second phase modulation signal functions to bias the phase difference of the counter-propagating light waves to substantially null the phase shift produced in the counter-propagating light wave phase difference by the rotation rate. In this context, the bias applied by the second phase modulation signal does not merely serve to compensate for the component of the output signal at frequency $f_b$ caused by the rotation rate, but it effectively nulls the phase difference signal produced by that rotation rate, thereby removing that related component from the output signal.

The rotation velocity may be determined by use of output display 208 which is connected through a band pass filter 326 to line 324. Specifically, the modulation signal from line 324 is connected by line 330 to filter 326 which allows only the signal at the second modulation frequency $f_m$ to pass. The signal from filter 326 passes on line 332 to the output display 208. The signal on display 208 corresponds to the amplitude of the second modulation signal at frequency $f_m$ and, thus, may be used to determine the rotation velocity. Display 208 and related circuitry for determining rotation velocity will be described in detail hereafter.

Figure 12:
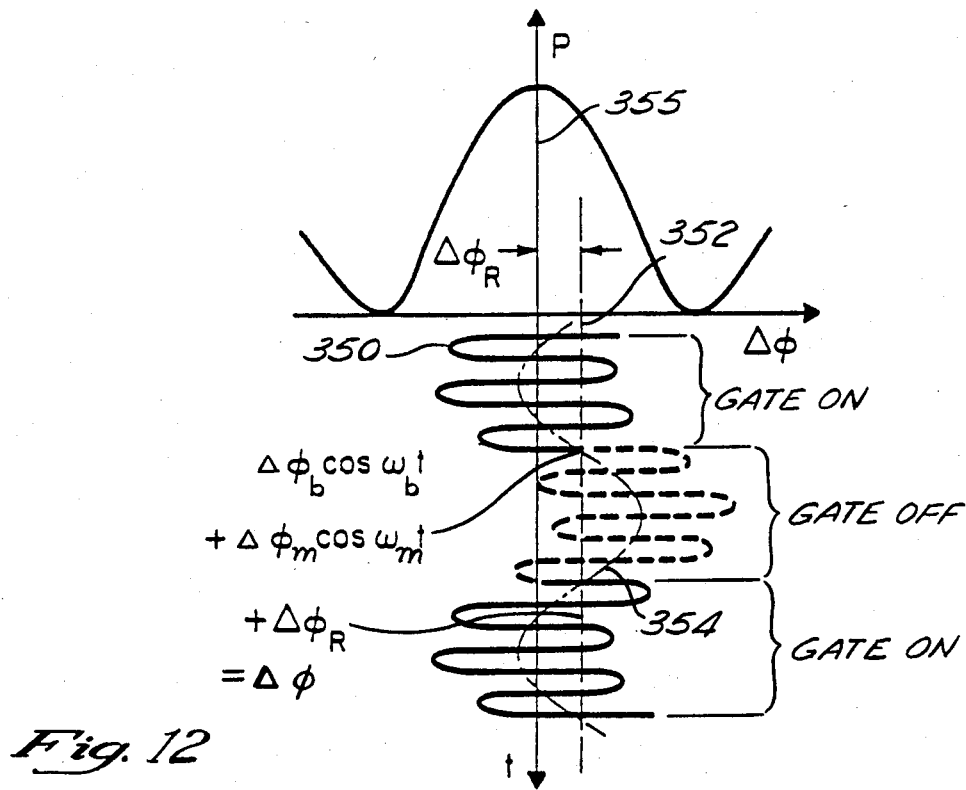
FIG. 12 is a diagram of the overall phase shift resulting from the bias phase modulation and the lower frequency phase modulation in conjunction with a constant bias resulting from the Sagnac effect.

By reference to FIG. 12, it is possible to graphically describe the resulting relative phase shift experienced between the counter propagating waves as a result of loop rotation and phase modulation in the apparatus illustrated in FIG. 11. In FIG. 12 it can be seen that the optical output signal (not shown) taken at the photodetector 30 comprises the resultant or total phase shift curve 350 which represents the sum of the Sagnac phase shift $\Delta\phi_R$ (represented by the constant bias 352 for constant rotational velocity) and the sinusoidally time varying, second phase difference modulation signal $\Delta\phi_m$ (cos $\omega_m t$) represented by the curve 354, and the sinusoidally time varying, bias phase difference modulation difference signal $\Delta\phi_b$ (cos $\omega_b t$). The resultant phase shift $\Delta\phi$ is thus defined as:

$$\Delta\phi = (\Delta\phi_b \cos \omega_b t) + (\Delta\phi_m \cos \omega_m t) + \Delta\phi_R \quad (11)$$

The time average value of $\Delta\phi$ can be adjusted to a value of approximately zero by gating off a portion of the signal. Thus, as illustrated in FIG. 12, every other half cycle of the second phase difference modulation at frequency $f_m$ 354 is gated off. By adjusting the amplitude of the second phase difference modulation 354 in this situation, the portion of the bias modulation signal 350 which is gated on can be positioned about vertical axis 355.

In the circuit illustrated in FIG. 11, gate 304 is turned on and off in synchronism with the second phase modulation signal by use of a gating signal from signal generator 308. Thus, with the gate signal on line 306 synchronized to switch gate 304 at each half cycle of the second phase modulation signal frequency $f_m$, the waveform of FIG. 12 may be produced. It will be appreciated that during the time that the signals are gated off, as indicated in FIG. 12, the value of zero will be present on the output of detector 30 (FIG. 11).

The output signal at frequency $f_b$ which is produced as a result of the conditions described above is illustrated at 360 of FIG. 13. It is noted that line 360 is, for purposes of illustration, not drawn to scale with respect to the second phase modulation waveform 354. Thus, it can be seen that by adjusting the amplitude of the second phase modulation signal 354 until the time average value of the gated portion of the output signal at the frequency $f_b$ equals zero, it is possible to determine the rotational velocity of the loop. Specifically, the rotation velocity is determined by observing the amplitude of the second phase modulation signal which caused the zero error signal.

In the absence of the modulation signal, the detector output amplitude $I_b$ at the bias modulation frequency $f_b$ may be described mathematically as $$I_b = CP_0 J_1(\Delta\phi_b) \sin \phi \quad (12)$$

Where C is a constant;
$P_0$ is the optical power incident on the detector;
$\Delta\phi_b$ is the amplitude of the phase difference modulation between the counter propagating waves;
$J_1$ is the first order bessel function of the first kind; and
$\Delta\phi$ is the phase difference between the counter propagating waves in the sensing coil.

Figure 13:
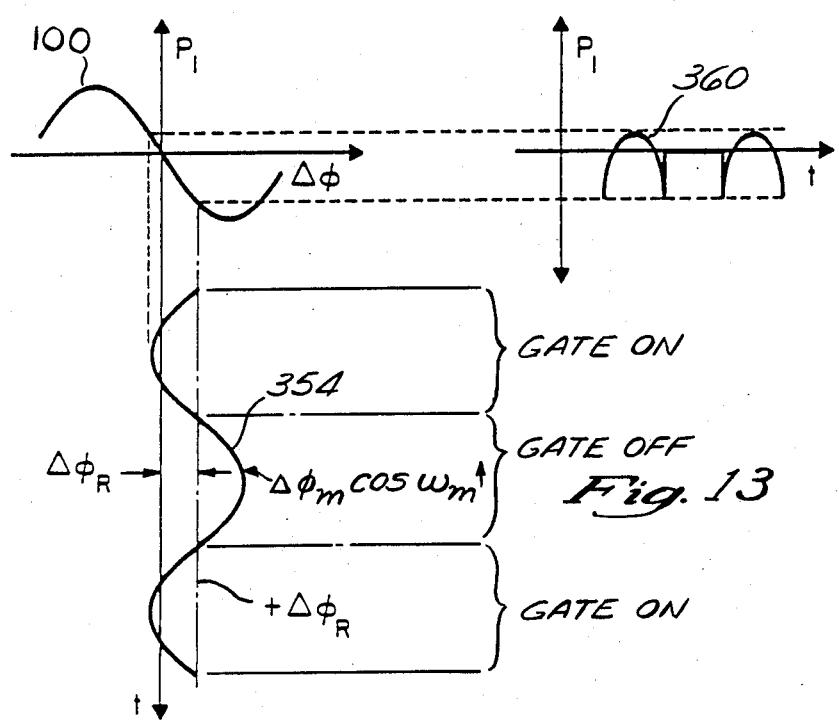
FIG. 13 is a diagram of the overall phase shift for lower frequency phase modulation in conjunction with a constant bias resulting from the Sagnac effect, and the optical output signal which results from gating.

When the second phase modulation signal is additionally applied at a frequency $f_m$ much lower than the bias modulation frequency $f_b$, the waveform of the phase difference modulation in the presence of rotation induced non-reciprocal phase shift $\Delta\phi_R$, is as illustrated in FIG. 12. When the signal from the photodetector 30 is switched off during fifty percent of each cycle of phase modulation at frequency $f_m$, the demodulated output power at the bias modulation frequency $f_b$ is illustrated in FIG. 13. Under the condition that the lock-in amplifier integrates the signal over many cycles of phase modulation at frequency $f_m$, the demodulated output power can be made zero by adjusting the amplitude of the phase difference modulation $\Delta\phi_m$. This means that the rotation induced non-reciprocal phase shift can be canceled on the time average by the phase modulation with gating. The demodulated output power is illustrated at 360 in FIG. 13. The time average of this output signal 360 is described as:

$$I_b = -(C/T) P_0 J_1(\Delta\phi_b) \int_{-T/4}^{T/4} \sin(\Delta\phi_R + \Delta\phi_m \cos\omega_m t) dt \quad (13)$$

where
$T = 1/f_m$;
$\Omega_m = 2\pi f_m$; and $\Delta\phi_m$ is the amplitude of the phase difference modulation at frequency $f_m$.

The relationship between the Sagnac phase shift $\Delta\phi_R$ and the magnitude $\Delta\phi_m$ of the second modulation signal at the frequency $f_m$ to null the demodulated power to zero can be obtained from the relation:

$$\tan\Delta\phi_R = -\frac{4}{\pi} \frac{1}{J_0(\Delta\phi_m)} \sum_{\text{odd}} \frac{1}{n} J_n(\Delta\phi_m) \quad (14)$$

Where: $J_n$ is the n-th order Bessell function.

Figure 14:
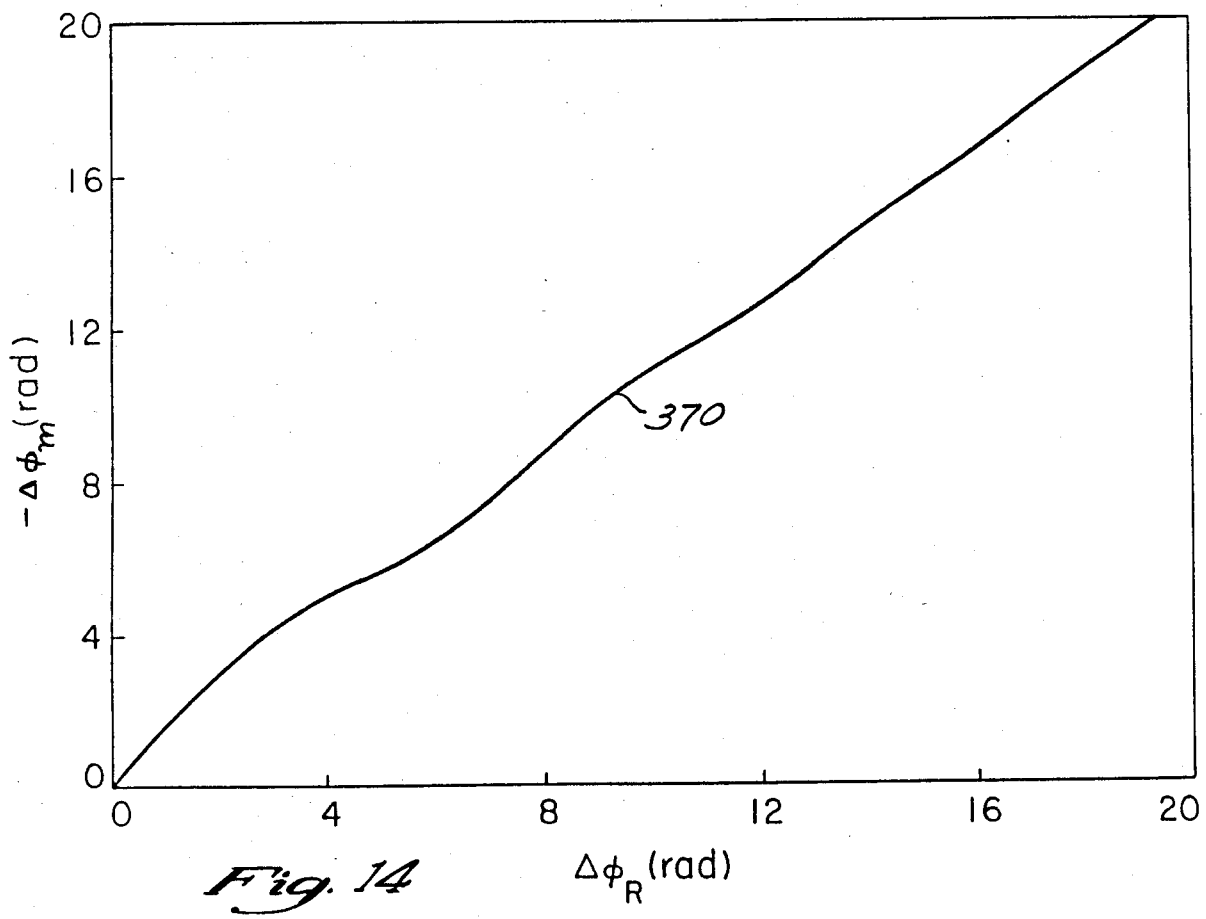
FIG. 14 is a graph of the scale factor of the rotation sensor illustrated in FIG. 11.

The relationship of the amplitude of the second phase difference modulation to the value of $\Delta\phi_R$, described by equation 14 is graphically illustrated in FIG. 14. The curve 370 of FIG. 14 represents the response of the sensor to rotation when the gyro is operated in an electronically closed loop configuration. Curve 370 graphically illustrates the transfer function or scale factor which describes the amplitude of the second phase difference modulation $\Delta\phi_m$ which is necessary to substantially null out the Sagnac phase shift $(\Delta\phi_R)$ in the gated apparatus illustrated in FIG. 11.

It will be seen that the scale factor of FIG. 14 has a monotonic behavior which provides for the dynamic range for gyroscope operation which is limited only by that of the phase modulator used. The small deviation of the scale factor curve 370 from complete linearity results from the fact that the net non-reciprocal phase shift is averaged to zero using a time varying phase shift instead of a DC phase shift. Thus, the invention provides a means to eliminate the ambiguity in the detector output signal for higher rotation rates where prior art sensors would not know which of several possible rotation rates was causing the detector output of that particular characteristic.

Because the frequency of the second phase modulation signal at frequency $f_m$ is arbitrary, that frequency and phase needs to have no fixed relationship with the bias phase modulation operated at the Proper frequency. As a result, less stability is required of the components which generate and control the two excitation signals. In addition, this lack of frequency and phase relationship between two modulations permits the electrical combining of the two excitation signals and their application to a single phase modulator without compromising the rotation sensors sensitivity.

Several of the other components of the apparatus of FIG. 11 are described in more detail below.

Figure 15:
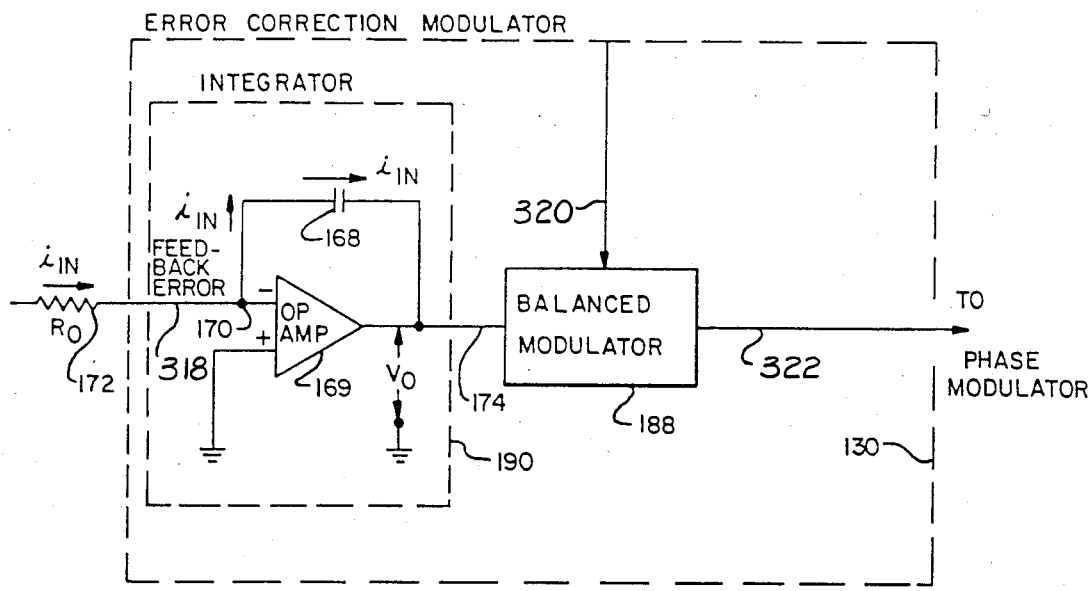
FIG. 15 is a circuit diagram for an error correction modulator.

FIG. 15 shows one embodiment of the error correction modulator 130. In this embodiment, the error signal on the line 318 is coupled to the inverting input of an operational amplifier connected as an integrator. The exact structural details of practical integrators are well known to those skilled in the art and no further discussion of those details will be given here.

As is well known in the art of operational amplifiers, the negative feedback voltage developed across the capacitor tends to keep the point 170 at a virtual ground. That is, the voltage at the point 170 is held at or near zero volts by the negative feedback. However, no current flows to ground through this virtual short. The input current $i_{in}$ to the operational amplifier 169 through the output impedance of the lock-in amplifier 46, represented by the impedance $R_o$ 172, is equal to the output error voltage of the lock-in amplifier 46 divided by its output impedance $R_o$, since the impedance to ground from the point 170 is zero. But since no current flows to ground from the node 170, the input current $i_{in}$ flows through the capacitor 168 and an output voltage $V_0$ relative to ground, builds up on the line 174 as a function of time. The expression for the output voltage $V_0$ as a function of time is:

$$V_0 = -\frac{1}{C} \int i_{in} dt \quad (15)$$

where C is the value of the capacitor 168.

Figure 16:
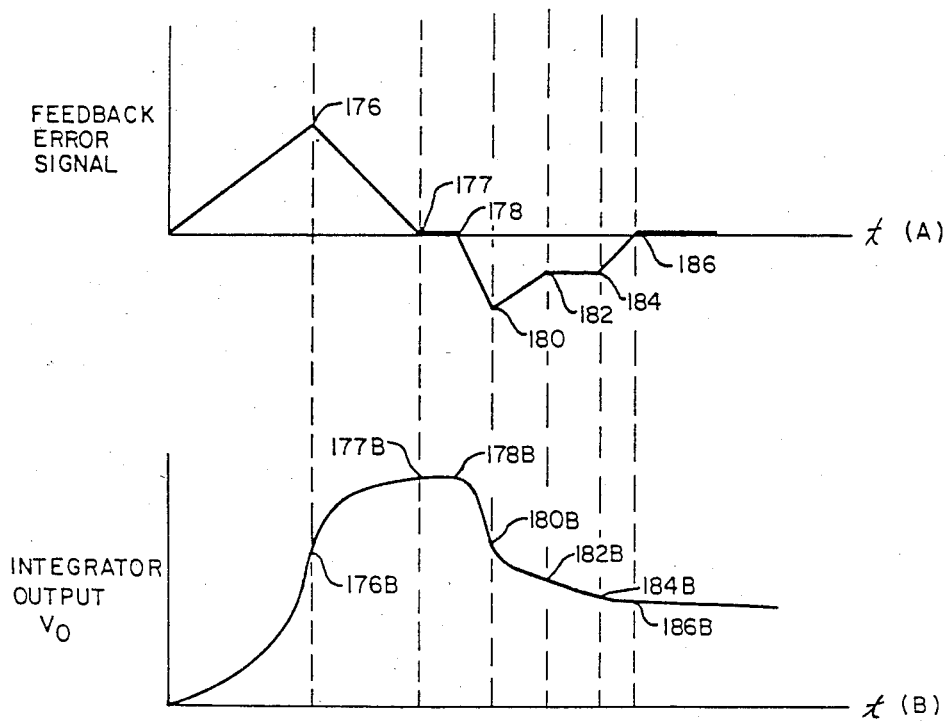
FIG. 16 is a diagram of the response of the modulator of FIG. 15 to a sample error signal.

Referring to FIG. 16, the response characteristics for the operational amplifier integrator 169 as shown. FIG. 16(A) shows a hypothetical error signal on the line 318. The output voltage $V_0$ of the integrator on the line 174 is plotted in FIG. 16(B).

It can be seen from FIG. 16(B) that for zero error signals, the output voltage curve has zero slope and for increasing magnitudes of non-zero error signals, the magnitude of the slope of the output voltage curve for $V_0$ increases. That is, the sign of the slope depends upon whether the error signal is positive or negative, and the steepness of the slope at any instant in time depends upon the magnitude of the error signal at that instant in time.

As the error signal increases from the origin to the point 176, the integrator output signal $V_0$ increases to the point 176B. Referring again to FIG. 15, a conventional balanced modulator such as an MC1496L, manufactured by Motorola, and associated circuits converts this input voltage $V_0$ on the line 174 to corresponding changes in the envelope of the driving signal on the line 322. That is, the modulator 188 amplitude modulates the fixed amplitude signal on the line 320 with the signal on the line 174. This driving signal on the line 322 is then transmitted to line 324 where it is combined with the bias modulation signal from generator 40 and applied to the phase modulator 38.

As the amplitude of the driving signal on the line 322 increases, the amplitude of the low frequency component in the optical output signal begins to rise. When it rises far enough, the time average value of the gated signal tends to cancel the first harmonic component caused by the rotation. This tends to reduce the error signal as shown between the points 176 and 177 in FIG. 16(A). The decreasing error signal changes the steepness of the slope of the integrator output voltage $V_0$ in FIG. 16(B) as shown between the points 176B and 177B. At the point 177 in FIG. 16(A), the magnitude of the driving signal is just enough to cause cancellation of all of the rotation caused first harmonic component in the optical output, and thus the error signal will be zero. This is reflected by a flat, non-zero portion of the integrator output voltage curve for $V_0$ between the points 177B and 178B.

At the time 178 in this hypothetical situation, the rotation rate of the loop 14 changes such that the error signal changes sign and begins to increase in magnitude as shown between 178 and 180 in FIG. 16(A). This causes a decrease in the output voltage $V_0$ because the current $i_{in}$ changes directions and the voltage on the capacitor 168 begins to change. This is shown between the points 178B and 180B in FIG. 16(B). The effect is to decrease the amplitude of the driving signal which causes the error signal to trend back toward zero as seen between the points 180 and 182 in FIG. 16(A).

At the time 182 in the hypothetical situation, the rotation of the loop 14 again changes such that more first harmonic component is generated by the Sagnac phase shift so as to flatten the error signal curve as illustrated between the points 182 and 184. This causes the integrator output voltage to ramp downward at a constant slope to decrease the amplitude of the second or low frequency phase modulation signal between the points 182B and 184B.

At the time 184, the rotation rate of the loop again changes but the error signal is still negative and non-zero. The non-zero error signal causes the integrator output voltage $V_0$ to continue to decrease, thereby changing the amplitude of the driving signal and causing the error signal to move toward zero as shown between the points 184 and 186.

Once the error signal reaches zero, the integrator output voltage holds steady at whatever amplitude caused the cancellation of all or substantially all of the Sagnac generated first harmonic component. The situation at the time 186 represents a non-zero constant rotation rate in the loop 14 where the amplitude of the driving signal on the line 140 has been adjusted to the proper level to just cause cancellation of the Sagnac-generated first harmonic component in the optical output signal.

Those skilled in the art will appreciate that if rotation continues accelerating in one direction, the output voltage $V_0$ could rise above safe levels and cause component failures in, for example, the amplitude modulator 188 for the circuit of FIG. 15. To prevent such occurrences, voltage limiting devices should be coupled to the integrator to limit the maximum positive and negative voltage excursions of $V_0$.

Figure 17:
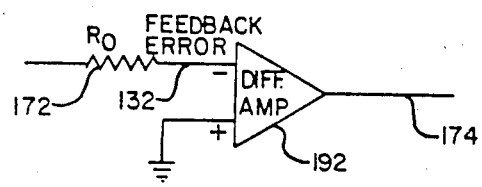
FIG. 17 is a diagram of a preferred error correction modulator.

Referring to FIG. 17, there is shown the preferred embodiment for a portion of the error-correction modulator circuit 130 to replace the integrator 190 in FIG. 15. In this embodiment, a differential amplifier 192 has its inverting input coupled to the error signal on the line 318 and has its output is coupled to the amplitude modulator 188 by the line 174.

Figure 18:
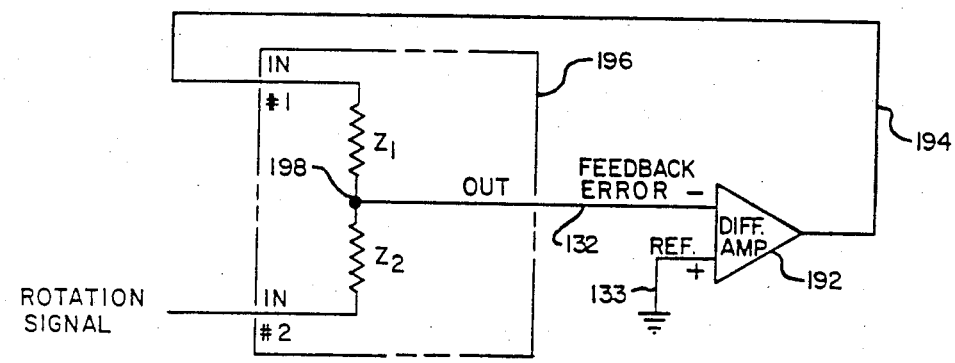
FIG. 18 is a schematic diagram of the overall sensor using the error correction modulator of FIG. 17.

The manner in which the system depicted in FIG. 17 works is better understood with reference to FIG. 18, which depicts the overall rotation sensor in schematic terms with the components in the sensor represented by a three-port network 196 coupled to the differential amplifier 192. The optical portion and most of the electronic components of the sensor have been represented by the voltage divider impedance network 196 which has two inputs coupled to either end of the two impedances $Z_1$ and $Z_2$. The midpoint of this divider is coupled to the inverting input of the differential amplifier 192.

When a rotation is applied to the loop, a rotation signal (symbolic) will be applied to the second input of the three port network 196 which results in an error signal being applied to the line 318 coupled to the inverting input of the differential amplifier 192. The difference between this input error signal and the reference signal on the line 133, which in this case is ground potential, is amplified by the differential amplifier 192 and the inverted, amplified difference signal is applied to the output line 194. This output line is also coupled to the first input of the network 196 such that negative feedback occurs through the impedance $Z_1$ tending to cancel the voltage at the point 198 caused by the rotation signal.

The signal on the line 194 then tends to minimize the voltage swings at the point 198. The point 198 physically represents the output of the lock-in amplifier 46 in FIG. 11. The impedances $Z_1$ and $Z_2$ are virtual impedances representing the overall transfer function and loop gain of the optical and electronic portions of the system.

The time response, phase margin, bandwidth and sensitivity of the system are matters of design choice depending upon the application and standard feedback system analysis can be used to establish system parameters.

The effect of the feedback through the impedance $Z_1$ is to restrict the swings in the error signal on the output line 318 of the lock-in amplifier to a small range represented by the box 200 in FIG. 10. The range is a matter of design choice and depends upon the gain of the differential amplifier 192. Higher gain results in a smaller range of variation of the input signal, i.e., a smaller box but less stability.

Any structure which reacts to non-zero error signals so as to reduce the error signal to zero or substantially zero by increasing or decreasing the magnitude of the second phase modulation driving signal on the line 322 will suffice for purposes of the invention. For some embodiments it will be desirable to maintain the level of the second phase modulation driving signal at the cancellation amplitude which reduces the error signal to zero or near zero. The exact circuit used to accomplish this function is not critical to the invention.

Figure 19:
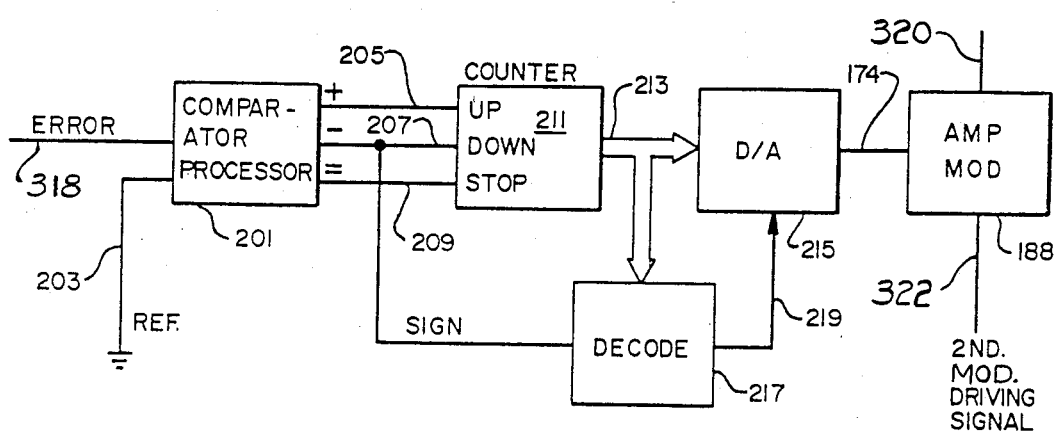
FIG. 19 is a diagram of another error correction modulator which could be used in the embodiment of FIG. 11.

An alternative circuit which could be used for the error correction modulator is as shown in FIG. 19. In this embodiment, the error signal on the line 318 is coupled to the input of a comparison processor 201. The comparison processor has a reference voltage applied to its reference input 203 which is ground potential in this case. The comparison processor compares the error signal on the line 318 with the reference signal on the line 203 and generates one of three outputs. If the error signal is positive and non-zero, the output line 205 is activated as with a logic one level. If the error signal is negative and non-zero, the line 207 is activated. Finally, if the error signal is equal to the reference signal, the =- line 205 is activated.

An up-down counter 211 has its up input coupled to the line 205 and begins counting up from zero when the line 205 is active. The binary count is continually changing the digital pattern on the output bus 213 as the count progresses where the data on the bus 213 at any moment represents the binary representation of the count.

A digital to analog converter continuously or periodically samples the value of the binary count on the bus 213 and converts the digital data to an analog output signal on the line 174. This analog signal is used by the conventional amplitude modulator 188 to amplitude modulate the second phase modulation driving signal on the line 320 and apply it to the line 322.

The changing amplitude of the second phase modulation driving signal is reflected in a changing error signal on the line 318. That is the error signal will be trending toward the reference signal voltage.

When the error signal reaches the reference voltage, the comparator processor 201 activates the line 209 which is coupled to the stop input of the counter 211, thereby stopping the count. The D/A converter then holds the amplitude level of the second harmonic driving signal steady at the then existing level until the error signal changes again.

When the error signal becomes negative and non-zero, the process repeats itself but the counter 215 starts counting down from zero or from the then existing positive count. If the count was zero when the line 207 was activated, a decoder 217 activates a change sign line 219 which causes the D/A converter to change the sign of the analog output voltage on the line 174. If the count was not zero when the line 207 was activated, the decoder 217 does not activate the line 219, and the D/A converter leaves the analog signal on the line 174 in the same sign as when the line 205 was activated but begins to lower the amplitude as the count decreases. This process continues until the line 209 is activated.

Because the transfer function is non linear in some regions, linear elements used to translate the amplitude of the second harmonic driving signal to the magnitude of the Sagnac phase shift introduce errors. A device may be used at the output to store the transfer function or to solve the transfer function for the rotation rate or Sagnac phase shift given the cancellation amplitude of the second harmonic driving signal. That is, it is advantageous to convert from the amplitude of the driving signal on the line 322 which cancels the first harmonic component in the output due to the Sagnac phase shift to the rotation rate or Sagnac phase shift itself. Such is the purpose of the output display circuit 208 in FIG. 11.

Figure 20:
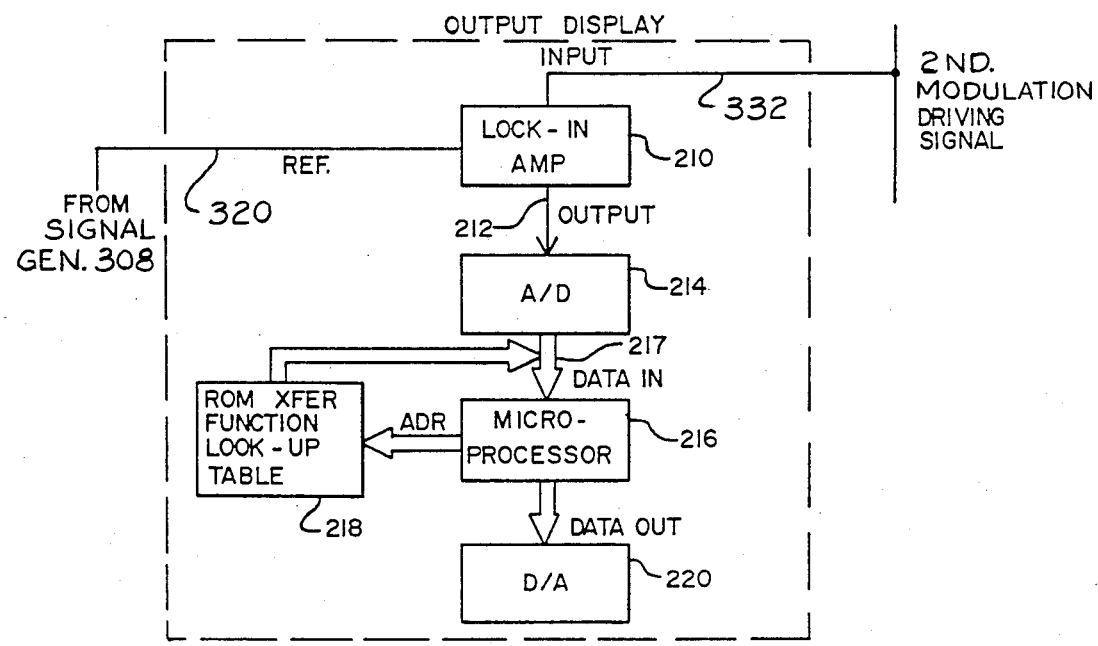
FIG. 20 is a diagram of the preferred embodiment of an output circuit for the rotation sensor for converting the amplitude of the lower frequency driving signal to the rotation rate.

FIG. 20 shows the preferred circuit for the output display 208. The first harmonic of the driving signal as passed through band pass filter 326 onto line 322 is coupled to the input of a lock-in amplifier 210. The lock-in amplifier is tuned to the driving signal, i.e., it has as its reference signal the unmodulated signal on the line 320 from the signal generator 308 in FIG. 11. The purpose of the lock-in amplifier 210 is to filter out all noise on the line 332 which clutters the desired waveform. This noise can result from noise on the power lines, electromagnetic disturbances, cross talk with the driving signal on the line 324 and other miscellaneous sources.

The output signal on the line 212 is proportional to the amplitude of the filtered driving signal at the output 212 of the lock-in amplifier, and is coupled to an analog to digital (A/D) converter 214 where it is converted to digital data. This data is used by a microprocessor or computer 216 to address a look-up table in a memory 218 which stores digital data regarding the rotation rate which corresponds to each amplitude of the driving signal as determined by the transfer function of Equation (15).

The digital data at the output 217 of the A/D converter 214 is used by the microprocessor 216 to access the proper address in the ROM 218 which stores the digital data indicating the corresponding Sagnac phase shift or rotation rate for that particular amplitude of the driving signal on the line 332. The program for the microprocessor 216 to perform this addressing function will be apparent to those skilled in the art and any program to perform this function will suffice. The digital data output from the ROM can then be converted to analog form by a digital to analog converter 220 or it can be used in its digital form.

In other embodiments, the microprocessor 216 could be programmed to solve the transfer function of Equation (14) by using the data from the A/D converter 214 as the variable $\Delta\phi_m$. In these embodiments, the ROM 218 would contain the program for performing the calculation required in Equation (14). The exact program used to perform this calculation is not critical, and programs will be known to those skilled in the art to perform this calculation. Any program which can perform this calculation will be adequate for purposes of the invention.

Figure 21:
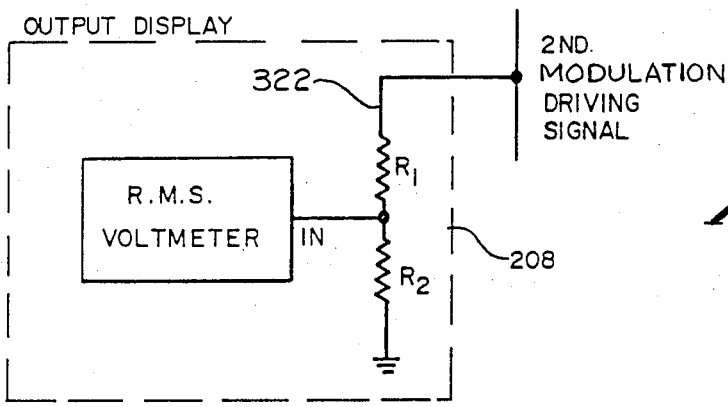
FIG. 21 is a diagram of an output display circuit which could be used in linear regions of the scale factor.

Other embodiments might use an R.M.S. voltmeter instead of the lock-in amplifier 210, but such a structure would lead to errors since any noise on the line 332 might be averaged in and misinterpreted as false amplitude of the driving signal. The R.M.S. voltmeter has its input at the midpoint of a voltage divider as shown in FIG. 21. The driving signal is applied to the node 221 of a voltage divider comprised of the resistors R1 and R2. The resistors R1 and R2 are selected to reflect the slope of the transfer function in the linear region such that for a given amplitude of the driving signal at the node 221 a signal having an amplitude proportional to the rotation rate will be developed at the node 222. This signal is coupled to the input of an R.M.S. voltmeter to be read as the Sagnac phase shift or rotation rate.

Figure 22:
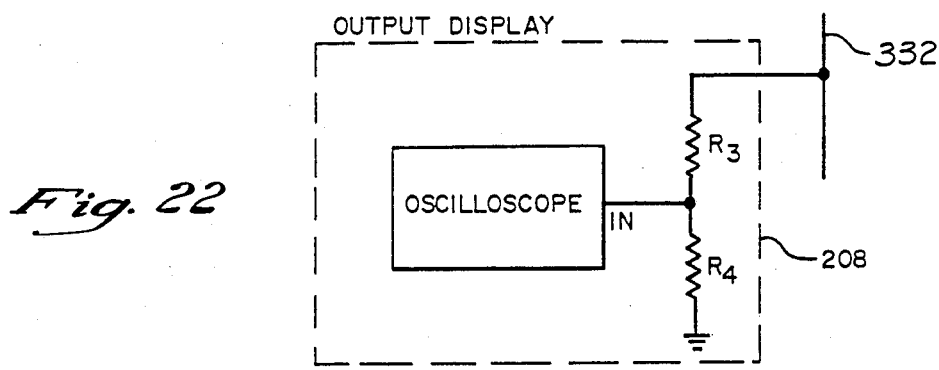
FIG. 22 is a diagram of another output display circuit which could be used in linear regions of the scale factor.

Further, an oscilloscope could also be used instead of an R.M.S. voltmeter, as shown in FIG. 23, to detect the amplitude of the driving signal. Again a linear scaling network comprised of the resistors R3 and R4 to scale the input to the oscilloscope. The embodiments of FIGS. 21 and 22 are most accurate in the linear regions of the transfer function.

Any other device capable of measuring waveforms at the lower modulation frequency could also be used for the output display circuit 208. For example, analog curve matching devices could be used to compensate for the transfer function curve and give an output proportional to the rotation rate. Further, the ROM look-up table and microprocessor of FIG. 20 could be dispensed in the approximately linear regions of the transfer function curve such that a simplified FIG. 20 embodiment could also be used in the approximately linear region for an approximate result.

Another preferred embodiment of a method and apparatus for sensing rotation with a generally linear scale factor, over an extended dynamic range, may be described with reference to FIGS. 23-29.

In a device such as that illustrated in FIG. 1, introduction of a time-varying signal through the asymmetrically positioned phase modulator 38 causes a phase difference between counter-propagating waves when measured at the output of detector 30. This induced differential phase shift $\Delta\phi(t)$ is defined as:

$$\Delta\phi(t)=\phi(t)-\phi(t-\tau) \tag{16}$$

Where $\phi(t)$ is the phase shift produced by the phase modulator at time t; and $\tau$ is the time difference between interfering waves passing through the phase modulator 38.

Referring to FIG. 23, it is seen that a DC phase difference between counter-propagating waves at a given time $\Delta\phi(t)$ may be achieved by applying a linear phase ramp such as that indicated at 400 to the counter-propagating waves through phase modulator 38. Specifically, linear phase ramp 400 represents the influence of the ramp signal input through modulator 38 on the wave propagating counter-clockwise in the sensing loop. The influence of the same input signal on the clockwise propagating signal is illustrated by line 402. The amount of difference $\tau$ between ramps 400 and 402 is dependent upon the asymmetric location of the phase modulator 38 in the sensing loop.

The phase difference signal $\Delta\phi(t)$ between the counter-clockwise and the clockwise propagating waves is indicated at 404. Of particular interest is the fact that this phase difference is a DC value whose magnitude may be varied by adjusting the slope of the ramp signal.

Thus, it becomes apparent that the ramp signal may be applied through phase modulator 38 to produce a DC phase difference magnitude which can be adjusted so as to effectively null out the rotation induced Sagnac phase shift.

One means of producing such a ramp function would be to utilize a frequency shifter located at an asymmetric position in the sensing loop. In this case Δφ would be defined as $$\Delta\phi = 2\pi\tau\Delta f \quad (17)$$

Where Δf is the amount of frequency shift. The use of a frequency shifter would provide an additional advantage of permitting frequency output to be utilized as a measure of rotation rate. However, a frequency shifter in a fiber form suitable for a gyroscope application has not been reported Commonly used fiber-optic phase modulators, such as modulator 38 which modulates fiber length, cannot provide a continuous phase ramp to produce the DC differential phase shift between the counter-propagating waves. Thus, to utilize a phase modulator in this application requires the simulation of a phase ramp.

FIG. 24 illustrates one waveform which may be utilized to simulate a phase ramp. Specifically, line 406 in FIG. 24(A) illustrates the application of a saw-tooth wave to a counterclockwise propagating signal in the sensing loop. Line 408 indicates the influence of the same saw-tooth wave shape, applied from an asymmetrically positioned phase modulator, to a clockwise propagating signal in the sensing loop. Line 410 in FIG. 24(B) represents the phase difference signal (Δφ(t)) produced by the phase difference between the interfering waves illustrated in FIG. 24(A).

As can be seen from the waveform represented by line 410, the phase difference cannot be constant at all times due to the resetting process and reciprocity of the two optical paths. However, during those periods indicated at 412 when line 410 defines a DC value, the DC Sagnac phase shift can be nulled out by adjusting the amplitude or frequency of the phase modulation. Thus, by applying the substantially DC phase bias to the phase difference of the counter-propagating light waves, the Sagnac phase shift experienced by the counter-propagating light wave phase difference is substantially nulled. It is further noted that, during the periods not included in the segments labeled 412, the zero Sagnac phase shift can be simulated by turning off the rotation signal received from detector 30 of FIG. 1.

As a result, the rotation induced Sagnac phase shift can be effectively nulled by a phase modulation induced phase difference for part of the time, and by turning off the signal at the light source 10 or at or after the detector 30 for the rest of the time. The slope of the ramp, which determines the differential phase shift, can be controlled by adjusting the amplitude of the modulation signal.

Of course, it will be appreciated that other waveforms having a ramp type configuration could also be utilized to produce a similar effect. For example, a triangle waveform phase modulation could be utilized, with the understanding that the production of a DC phase modulation output signal would require that the signal be turned off for a longer period than with the saw-tooth wave due to the shorter ramp length in the triangle wave shape.

One of the most commonly used fiber optic phase modulators is a piezo-electric cylinder with several turns of fiber wrapped around it, as described previously. Unfortunately, the frequency response of this device is not uniform over a wide frequency range. As a result, it is almost impossible to achieve a saw-tooth wave phase modulation of the type illustrated in FIG. 24, unless the amplitudes and phases of each Fourier component of the waveform are controlled.

One method for overcoming the problem of non-uniformity described above is to produce the saw-tooth or triangle waveform in an approximate manner by combining sinusoidal phase modulations in the all fiber optic rotation sensor. For example, a saw-tooth waveform may be simulated by combining the phase difference modulation at one frequency with the second harmonic of that frequency, with the amplitude of the second harmonic and the phase relationship of the waves properly adjusted. Likewise, the triangle waveform may be produced by combining the phase difference modulation at one frequency with the third harmonic of the frequency, which has been properly adjusted for amplitude and phase relationship.

FIG. 25 illustrates one preferred collection of waveforms which may be utilized in the all fiber optic gyroscope to simulate a saw-tooth waveform. Specifically, the first phase modulation signal for simulating the saw-tooth wave comprises a sine wave 450 of FIG. 25(A), which defines $\phi_1(t)$. The line 450 is illustrative of the effect of the sinusoidal phase modulation signal on the counterclockwise propagating wave in the sensing loop, and line 452 illustrates the influence of this same sinusoidal modulation signal on the clockwise propagating wave.

In FIG. 25(B) line 454 describes the influence on the counterclockwise propagating wave of a second phase modulation signal which is at the the second harmonic frequency of the sinusoidal modulation signal 450. This second harmonic phase modulation signal is referred to as $\phi_2(t)$. Line 456 of FIG. 25(B) illustrates the influence of the second harmonic phase modulation signal on the clockwise propagating wave.

FIG. 25(C) illustrates the waveforms comprising the sum of the modulation signals of FIGS. 25(A) and 25(B). Specifically, the saw-tooth type waveform indicated at 458 comprises the summation of waveforms 450 and 454, and illustrates the response of the counterclockwise propagating wave to this modulation signal. Likewise, the saw-tooth type waveform illustrated at 460 describes the sum of the waveforms 452 and 456, and illustrates the effect of this waveform on the clockwise propagating waves in the rotation sensor.

FIG. 25(D) illustrates the phase difference modulation with respect to time. This signal, indicated at 462, thus comprises the difference between the waveform 458 ($\phi(t)$) and waveform 460 ($\phi(t-\tau)$, where $\tau$ is the time difference between interfering waves passing through the phase modulator. The waveform of FIG. 25(D) may be described as $$\Delta\phi = \cos \omega_m t + 0.3 \cos 2\omega_m t \quad (18)$$

As described with respect to FIG. 24, it will be noted that the waveform 462(Δφ(t)) includes portions indicated at 464 which are generally linear. By gating the phase difference signal as described earlier, it is possible to utilize these generally linear or DC portions of the phase difference modulation 462 to effectively null the rotation induced Sagnac phase shift. As with the sawtooth waveform of FIG. 24, the amplitude of the DC portion 464 can be controlled by adjusting the amplitude or frequency of phase modulation. Thus, the DC-like sections of phase difference modulation 464 can be used to null out Sagnac phase shift $\Delta\phi_R$, and signal turn off during the periods not included in the 464 sections can be used to simulate zero $\Delta\phi_R$ for the rest of the time.

FIG. 26 graphically illustrates the combined influence of the phase modulations which can exist if the saw-tooth waveform 458 of FIG. 25(C) were introduced as a second modulation signal at a lower frequency ($f_m$) in the rotation sensor of FIG. 11. FIG. 26 also illustrates the output signal which would be detected as a result of phase modulation under those circumstances.

Specifically, the DC value for the phase shift resulting from the Sagnac phase shift at a fixed rotation rate is illustrated at 352. The phase modulation signal which is produced by the saw-tooth second modulation signal is illustrated at 354. In addition, the phase modulation produced by the bias modulation signal ($f_b$) is illustrated at 350. It is noted that, as with the sinusoidal modulation waveform utilized in the embodiment of FIG. 11, the saw-tooth modulation signal should be at a frequency which is much lower than the bias modulation frequency $f_b$.

It is seen in FIG. 26 that the phase modulation signals described above oscillate about the DC phase shift 352 which is $\Delta\phi_R$. It is also noted that the amplitude of the lower frequency, second phase modulation 354 has been adjusted so that the generally flat or DC portions of that line 354 are positioned on the vertical axis 355. Thus, by gating either the output of detector 30 or the light source 10 of the apparatus of FIG. 11, it is possible to output only those portions of the resulting output signal which are produced during the DC segment of the lower frequency modulation signal 354 as indicated at 464. During this gated period 464, resulting signals oscillate about the vertical axis 355. During the remaining periods, the output signal equals zero, thus simulating a situation where the Sagnac phase shift is nulled out.

The output resulting from gating the rotation sensor as described above and during the periods indicated at 464 of FIG. 26 produce an output signal having a waveform which is approximated by the waveform indicated at 466 of FIG. 26.

Of particular interest is the fact that the output signal 466 includes no first harmonic, indicating that the Sagnac phase shift $\Delta\phi_R$ has been substantially nulled during the gated periods, and is not monitored during the off periods. Thus, by monitoring the amplitude of the second phase modulation signal, it is possible to determine the amount of rotation experienced by the gyroscope, even in extended dynamic conditions of high rotation. Preferred circuits for detecting this signal amplitude and determining the rotation rate were described previously with respect to the sensor illustrated in FIG. 11.

Figure 27:
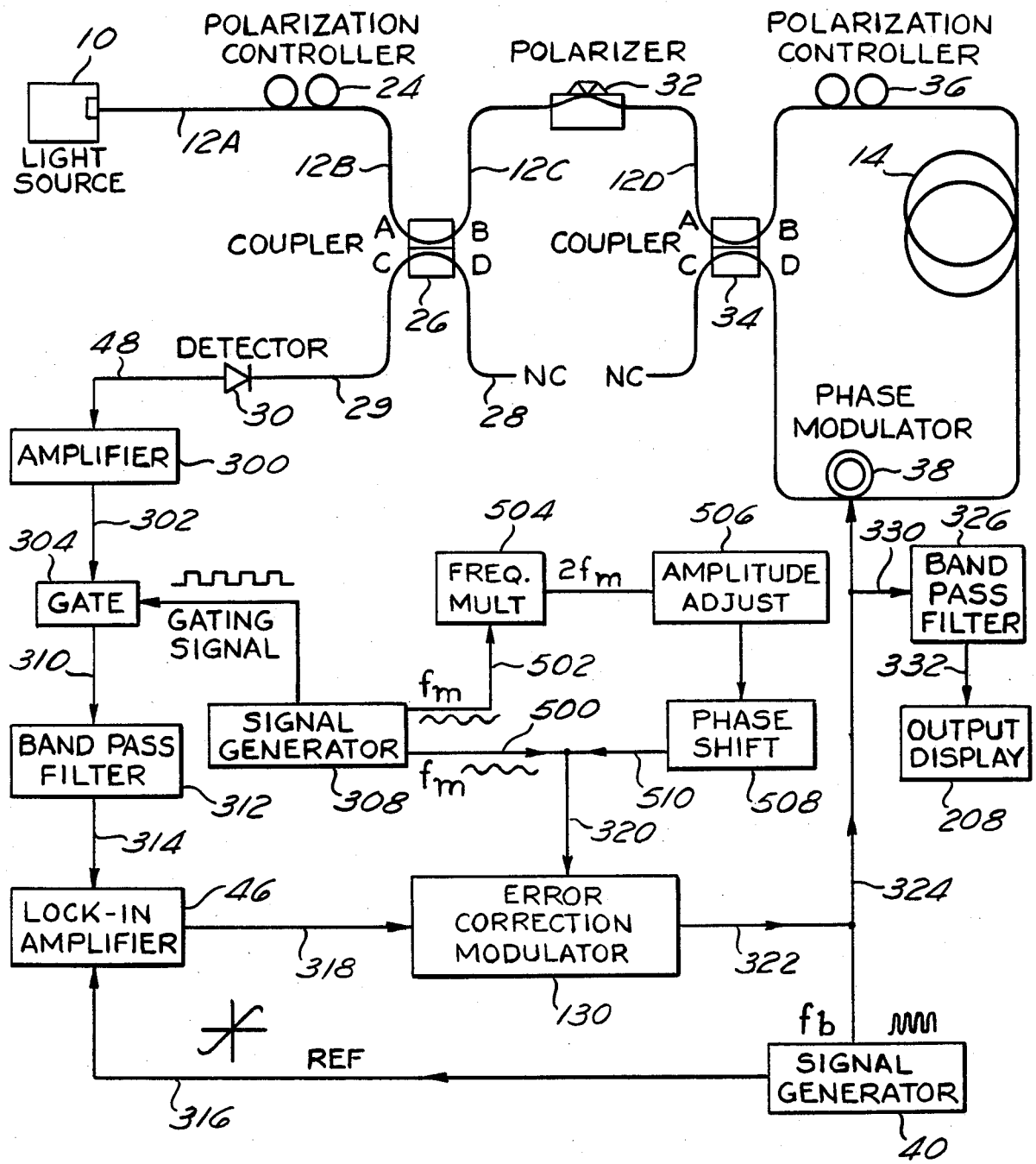
FIG. 27 is a diagram of one preferred embodiment of a gated, closed loop rotation sensor having extended dynamic range and a substantially linearized scale factor.

FIG. 27 illustrates one preferred embodiment of a rotation sensor which may be used for monitoring rotation through use of a simulated ramp modulation signal. It is noted that many of the components of the apparatus illustrated in FIG. 27 correspond both in construction and operation to elements contained in the apparatus of FIG. 11. Therefore, corresponding elements are identified with corresponding numbers.

Based on its construction, it becomes apparent that the rotation sensor illustrated in FIG. 27 functions in a manner which is substantially identical to the sensor of FIG. 11. However, the sensor illustrated in FIG. 27 replaces the sinusoidal second modulation signal with a low frequency modulation signal which is generally configured like a saw-tooth wave. In order to produce the saw-tooth modulation signal, the signal generator 308 transmits a sinusoidal waveform onto line 500. This sinusoidal waveform may be substantially identical to the waveform transmitted to line 320 from generator 308 in FIG. 11. In addition, the sinusoidal waveform from signal generator 308 is also transmitted on line 502 to a frequency multiplier 504 which receives the sinusoidal modulation signal at frequency $f_m$ and doubles its frequency to produce a second harmonic at frequency $2f_m$ which is transmitted to an amplitude adjustment device 506.

Device 506 may comprise any conventional means for adjusting the amplitude of a signal, such as a potentiometer. From the amplitude adjust device 506, the signal is transmitted to the phase shift circuit 136 where its phase is shifted relative to the first harmonic phase modulation signal from the generator 308 in the relationship which generally corresponds to that between the waveforms illustrated in FIGS. 25(A) and 25(B). The amplitude adjust circuit 506 and the phase shift circuit 508 may be manually set by a one time adjustment so long as the sinusoidal modulation waveform produced by signal generator 308 is maintained at a constant frequency $f_m$.

The second harmonic waveform from phase shift circuit 508 is transmitted onto line 510 which connects with line 500. Thus, the first harmonic signal on line 500 and the second harmonic signal on line 510 are combined to produce a phase modulation waveform having a generally saw-tooth configuration such as that illustrated in FIG. 25(C). The signals from lines 500 and 510 are combined and transmitted through line 320 to the error correction modulation 130, where the combined signal is processed in the manner which was described with reference to the rotation sensor illustrated in FIG. 11.

As was explained above, the rotation sensor of FIG. 27 functions to null out the DC influence of the Sagnac effect, by gating the output signal so as to detect only that portion of the output which results from phase modulation produced by the ramped portion of the saw-tooth wave. As a result, the gating signal on line 306 from signal generator 308 must be adjusted so that the gate 304 is turned on only during the ramped portion of the saw-tooth wave. It has been found that the gating signal from signal generator 308 should be set to gate approximately 30% of each period of the modulation signal on line 320. The portion of the waveform of line 320 which is gated may be identified by merely extrapolating upwardly the gated period identified at 464 in FIG. 25(D).

Figure 28:
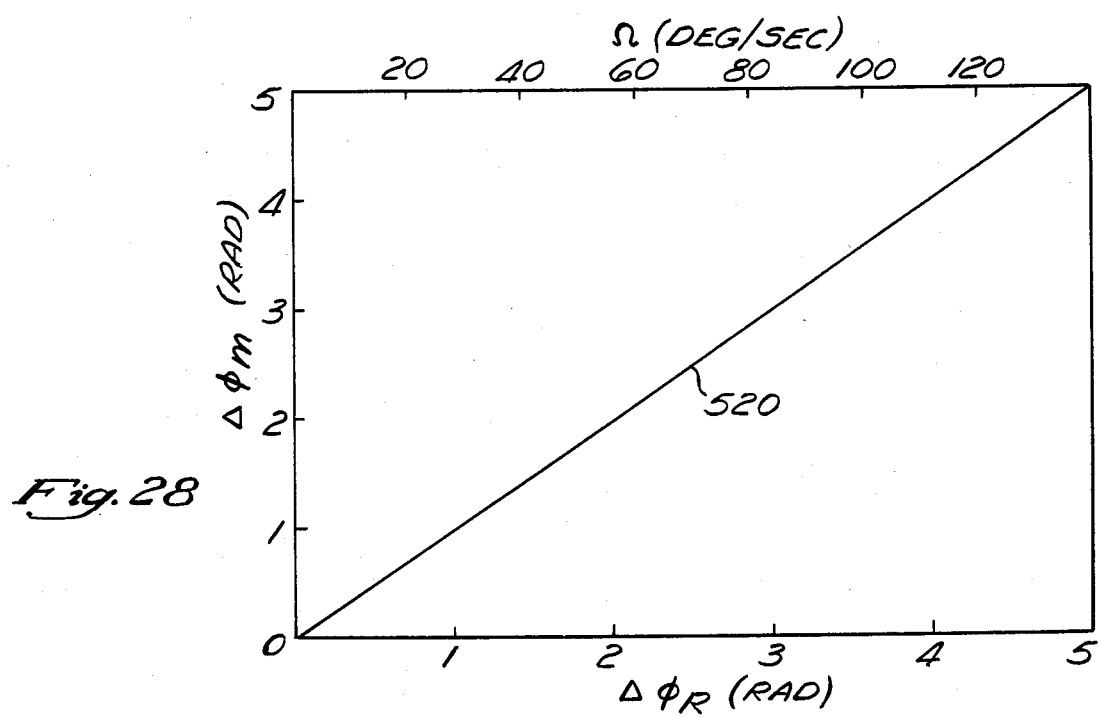
FIG. 28 is a graph of the scale factor of the sensor illustrated in FIG. 27.

By reference to FIG. 28, it is seen that the transfer function or a scale factor which results from the use of the rotation sensor of FIG. 27 is substantially linear. This result is obtained because of the fact that the Sagnac phase shift ($\Delta\phi_R$) is being nulled out by the phase difference modulation ($\Delta\phi_m$) which defines a substantially DC signal. Thus, as is indicated by the graph of FIG. 28, any increase in the magnitude of phase difference modulation produced by the Sagnac effect can be effectively nulled out by the corresponding increase in the magnitude of the phase difference modulation produced by the ramp portion of the saw-tooth wave modulation signal.

As with the rotation sensor of FIG. 11, the band pass filter 326 passes the signal at frequency $f_m$ from line 330 to an output display 208 which may be utilized to determine the rotation velocity by identifying the amplitude of the phase modulation signal which is necessary to cancel out the Sagnac phase shift.

The linearity of the scale factor illustrated in FIG. 28 practically eliminates the source wave length dependence of the gyroscope scale factor. This is possible because the amplitude of the phase difference modulation has the same wavelength dependence to the applied signal as the Sagnac phase shift has to the rotation rate ($1/\lambda$). Considering the fact that the wavelength of a light source is difficult to control, this phase modulation approach can improve the stability of the scale factor. The stability of the system is further improved if the feedback modulation frequencies $f_m$ and $2f_m$ do not coincide with the resonance frequency of the phase modulator. In addition, if harmonic frequencies of $f_m$ do not coincide with the bias modulation frequency $f_b$, then additional offset or noise in the rotation signal is also eliminated.

In the rotation sensor of FIG. 27, the gating time interval and relative amplitudes of the two frequency components can be adjusted to provide a linearity of the scale factor on the order of $10^{-5}$ up to 20 radians of Sagnac phase shift assuming a linear response of the phase modulator to the applied signal (e.g., when $\Delta\phi(t)\alpha(\cos(\omega_m t)+0.4\cos(2\omega_m t))$).

In both the rotation sensor of FIG. 11 and that of FIG. 27, the gating process introduces a possibility of loss of the optical power, and loss of rotation information during the time that the sensor is gated off. The device of FIG. 11(A), typically involves loss of half of the optical power since the device is gated off for approximately half the time. In the device of FIG. 27, with gating of approximately 30% of the waveform, the loss of optical output could occur during approximately 70% of the time. This information loss can result in an error in measured rotation angle, $\theta$, when a sudden change in angle occurs within a gated-out time interval. Take as an example the case of a full cycle of square wave angular acceleration using an acceleration rate of $|t^2\theta/dt^2| = 1,000°/\text{sec}^2$, which is a value used to represent maximum expected acceleration in many applications. For a typical gating frequency $f_m$ of 15 kHz, and with gating occurring during half of the time, an acceleration of the above amount within the first half of a gated out time interval followed by a deceleration of the same magnitude within the second half of the interval, leads to an error in $\theta$ of about $2.8\times10^{-7}$ degrees. Thus, it becomes apparent that the reliability of the phase sensing devices described herein is very good, with the influence of the gating arrangement causing only a very small likelihood of error in the measurement of the rotation velocity.

Figure 29:
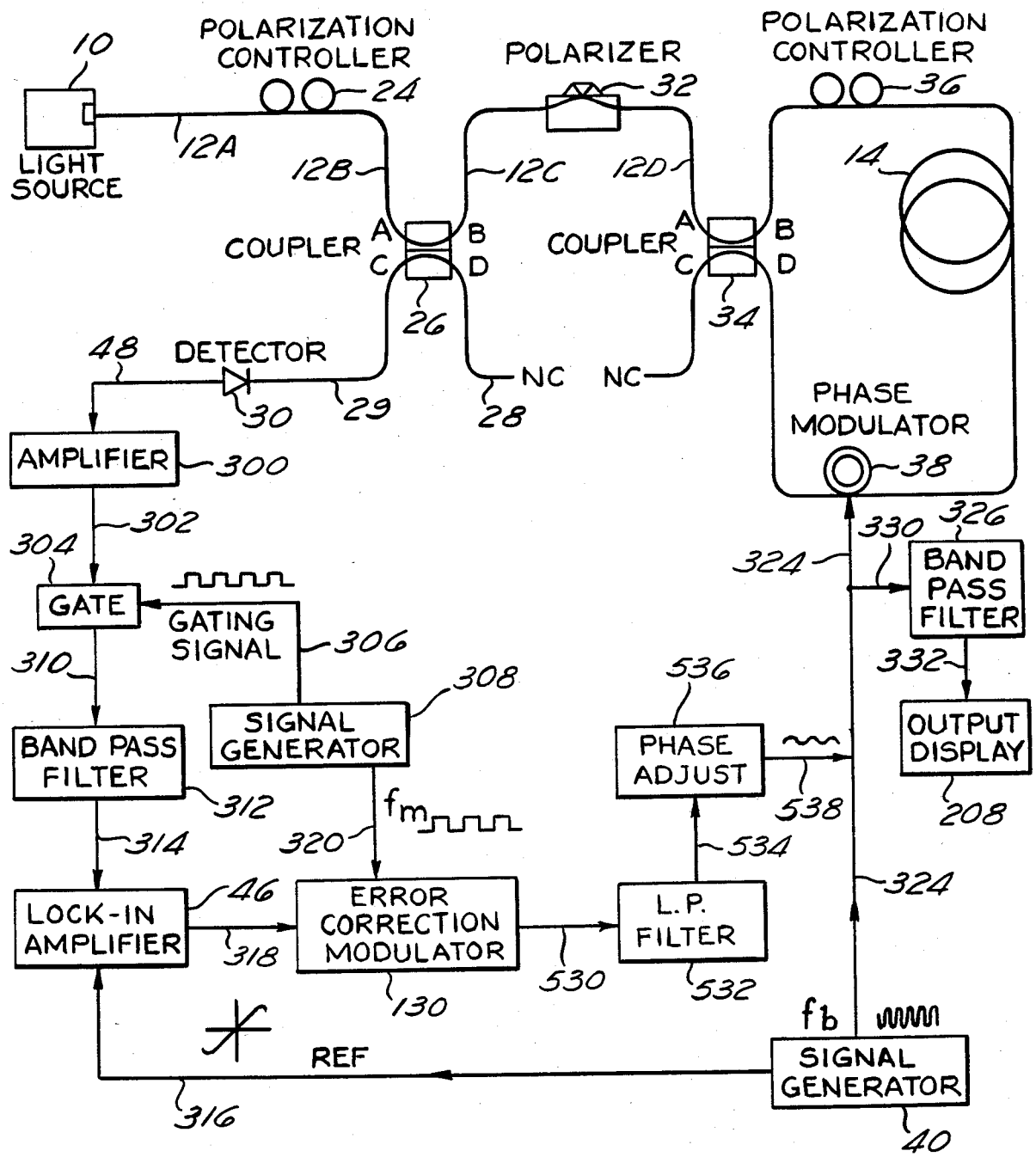
FIG. 29 is a diagram of another preferred embodiment of a gated, closed loop rotation sensor having extended dynamic range and a substantially linear transfer function.

FIG. 29 illustrates another embodiment of the rotation sensor utilizing the saw-tooth waveform. In this embodiment, the signal generator 308 produces a modulation signal at the frequency $f_m$ which comprises a train of square wave pulses. These square wave pulses contain harmonics of frequency $f_m$, including $2f_m$. These square wave pulses are transmitted via line 320 to the error correction modulator 130 and are processed in the manner described previously with respect to the sensors illustrated in FIGS. 11 and 27.

The square wave signal produced by modulator 130 is transmitted via line 530 to a low pass filter 532. Filter 532 eliminates all but the first and second harmonics of the signal transmitted from error correction modulator 130. The filtered signal is then transmitted via line 534 to a phase adjust circuit 536. One particular embodiment of phase output circuit 536 comprises a tunable band pass filter which is utilized to modify the phase of the second harmonic with respect to the first harmonic, so as to produce the desired saw-tooth waveform for the phase modulation.

The saw-tooth wave modulation signal from phase adjust 536 is transmitted onto line 538, where it is combined with the sinusoidal modulation frequency $f_b$ produced by signal generator 40 on line 324. The resulting signal is applied to the phase modulator 38 as the modulation signal. In all other respects, the sensor of FIG. 29 functions in a manner identical to the sensor of FIG. 27.

One particular embodiment of the rotation sensor illustrated in FIG. 29 is constructed and evaluated as follows. The fiber length and radius of the sensing coil is about 580 meters, and 7 centimeters, respectively. The wave length of light source utilized is about 830 nanometers. The pahse modulator 38 comprises a piezoelectric hollow cylinder with several turns of fiber wrapped around it. The first resonance frequency of the piezoelectric cylinder is about 20 khz. The bias modulation frequency $f_b$ produced by signal generator 40 is 172 khz, producing an amplitude of phase difference modulation ($\Delta\phi_b$) is approximately equal to 1.8 rad.

The saw-tooth waveform frequency modulation may be produced as follows. A train of square wave pulses is generated by the signal generator 308 which comprises a pulse generator, at a repetition frequency $f_m$ of 15 khz. The frequency spectrum of this signal contains harmonics of the fundamental frequency $f_m$. A low pass electric filter 532 suppresses all the frequency component leaving only the first and second harmonics of $f_m$. The relative amplitude of these frequency components (15 khz and 30 khz) may be adjusted by varying the width of square pulses from the pulse generator. A variable band pass filter comprises the phase adjust circuit 536, which is utilized to adjust the relative phase of the two frequency components. This signal, combined with the bias modulation signal from generator 40 is applied to the phase modulator 38.

The electric signal from the silicon photo detector 30 is gated with an electric switch or gate 304 by a synchronizing signal from the pulse generator 308, transmitted on line 306. The phase of gating may be adjusted by adjusting the pulse delay of the trigger signal. Approximately 30% of the signal from detector 30 is allowed to pass through the gate 304 to obtain a linearized scale factor. The signal from gate 304 is transmitted across line 310 and through band pass filter 312, which allows passage only on the bias modulation frequency $f_b$. This signal is then measured in the lock-in amplifier 46, as compared with the reference signal at the $f_b$ frequency, from signal generator 40. The comparison of the signal from filter 312 against the reference signal produce the error signal from lock in amplifier 46, which is transmitted to the error correction modulator 130 as was described previously in the specification. The actual scale factor which results from operation of the circuit of FIG. 29 corresponds to the scale factor illustrated at 520 in FIG. 28.

Although the rotation sensors described herein illustrate use of a single phase modulator, it will be appreciated by those skilled in the art that separate phase modulators could be utilized for the bias phase modulation and the lower frequency second phase modulation. Furthermore, it will be recognized that other waveforms could be utilized in conjunction with the gating arrangement described herein, with acceptable results. Such alternate embodiments are considered to be within the scope of the invention as described and claimed herein.

In summary, not only does the invention described herein comprise a significant improvement over the prior art in extending the dynamic range for rotation sensing over a very broad range of rotation velocities, but it also overcomes other long existent problems in the industry by (1) providing a means for obtaining extended dynamic rotation sensing while optionally utilizing only a single phase modulator; (2) providing for such rotation sensing with greatly improved stability by substantially suppressing the source wavelength dependence of the scale factor; and (3) providing a rotation sensor with significantly increased accuracy and reliability by linearizing the scale factor or transfer function and, thereby, significantly simplifying the signal processing required in the sensing device.

The invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within that scope.

What is claimed and desired to be secured by United States Letters Patent is:

What is claimed is:

1. A method of determining the rotation rate of an optical loop having counter-propagating light waves which are phase modulated at a first frequency and which are combined to form an output signal, wherein the method comprises the steps of:
   blanking at least a component of the output signal at selected times to provide a gated signal;
   biasing the phase of the counter-propagating light waves at a second substantially fixed frequency, to substantially null a component in the gated signal which is produced by loop rotation; and
   measuring the amount of bias to determine the rotation rate.

2. A method of determining the rotation rate of an optical loop as defined in claim 1 wherein the step of biasing the phase of the counter-propagating light waves comprises the steps of:
   phase modulating the counter-propagating light waves at the second, substantially fixed frequency;
   providing a feedback signal in response to the output signal, said feedback signal comprising a measure of the amount of phase shift produced by the rotation rate in the counter-propagating light wave phase difference which has not been nulled by the phase modulation; and
   adjusting the amplitude of the phase modulation at the second frequency in response to the feedback signal.

3. A method of determining the rotation rate of an optical loop as defined in claim 2 wherein the step of measuring the amount of bias comprises the step of monitoring amplitude of the phase modulation at the second frequency.

4. A method of determining the rotation rate of an optical loop as defined in claim 2, wherein the phase modulation of the counter-propagating light waves at the first frequency biases the output signal into a desired operating region.

5. A method of determining a rotation rate of a Sagnac fiber optic rotation sensor having counter-propagating waves which have phase modulation at a first frequency and which are combined to form an optical output signal, wherein the method comprises the steps of:
   phase modulating the counter-propagating waves at a second frequency which is lower than the first frequency;
   providing the optical output signal during only a portion of each period of the second frequency phase modulation;
   adjusting the amplitude of the second frequency phase modulation so that during the time the optical output signal is provided, the time average value of the second frequency phase modulation substantially cancels the component of said optical output signal at the first frequency caused by the rotation rate; and
   monitoring the amplitude of the second frequency phase modulation so as to identify the rotation rate of the rotation sensor.

6. A method of determining the rotation rate of a Sagnac fiber optic rotation sensor as defined in claim 5, wherein the step of providing the optical output signal during only a portion of each period of the second frequency phase modulation comprises the step of gating the rotation sensor in synchronism with the second frequency phase modulation so that the output signal is present only during a selected portion of each period of the second frequency phase modulation.

7. A method of determining the rotation rate of a Sagnac fiber optic rotation sensor as defined in claim 6 wherein the step of gating the rotation sensor comprises the step of electronically gating the optical output signal in response to the second frequency phase modulation.

8. A method of determining the rotation rate of a Sagnac fiber optic rotation sensor as defined in claim 5 wherein the step of adjusting the amplitude of the second frequency modulation comprises the steps of:
   detecting the component of the optical output signal at the first frequency caused by the rotation rate;
   providing an error signal which is representative of the amplitude and sign of said component of the optical output signal; and
   adjusting the amplitude of the second frequency modulation in response to the error signal, thereby driving the amplitude of said component of the optical output signal toward zero.

9. A method of determining the rotation rate of a Sagnac fiber optic rotation sensor as defined in claim 5 wherein the step of monitoring the amplitude of the second frequency phase modulation comprises the steps of:
   detecting the amplitude of the second frequency phase modulation; and
   superimposing a transfer function on the detected amplitude of the second frequency phase modulation to translate said amplitude to a rotation signal.

10. A method of detecting the rotation rate of an optical loop having counter-propagating light waves therein which are phase modulated at a first frequency, comprising the steps of:

combining the counter-propagating waves to produce an optical output signal;

gating the optical output signal so as to provide said signal only during a portion of each period of a second frequency which is lower than the first frequency;

detecting the amplitude of a component of the optical output signal which is caused by the rotation rate;

converting the amplitude of the component to a feedback error signal;

applying a driving signal at the second frequency to a phase modulator in the loop;

amplitude modulating the driving signal with the feedback error signal as the modulating signal so that during the time the optical signal is provided, a time average amplitude of the second frequency phase modulation substantially cancels the component of the optical output signal which is caused by the rotation rate; and monitoring the amplitude of the second frequency phase modulation so as to identify the rotation rate of the optical loop.

11. An apparatus for determining the rotation rate of an optical loop having counter-propagating light waves which are phase modulated at a first frequency and which are combined to form an output signal, the apparatus comprising:

means for blanking at least a component of the output signal at selected times to provide a gated signal;

means for biasing the phase of the counter-propagating light waves at a second, substantially fixed frequency, to substantially null a component in the gated signal which is produced by the rotation rate; and means for measuring the amount of bias to determine the rotation rate.

12. An apparatus for determining the rotation rate of an optical loop wherein light waves are counter-propagated, said light waves being phase modulated at a first frequency and being combined to form an output signal, the apparatus comprising:

a gating circuit for blanking at least a component of the output signal at selected times to provide a gated signal;

a biasing circuit for biasing the phase of the counter-propagating light waves at a second, substantially fixed frequency, to substantially null a component in the gated signal which is produced by loop rotation; and an output circuit for measuring the amount of bias to determine the rotation rate.

13. An apparatus for determining the rotation rate of an optical loop as defined in claim 12, wherein the biasing circuit comprises:

a first detector for detecting the output signal defining a phase difference signal produced by the counter-propagating light waves;

a first signal generator for producing a modulation signal at the second frequency;

an error correction circuit electrically connected to the first signal generator for controlling the amplitude of the modulation signal in accordance with the phase difference signal; and a phase modulator electrically connected to the error correction circuit for applying the modulation signal to the counter-propagating waves so as to phase modulate those waves and thus bias the phase difference signal by an amount which substantially nulls the phase shift produced in said phase difference by the rotation rate.

14. An apparatus for determining the rotation rate of an optical loop as defined in claim 13, wherein the gating circuit comprises:

a gating device electrically connected to the first detector and responsive to the first signal generator for blanking out selected portions of the phase difference signal; and a second detector electrically connected to the gating device for detecting the non-blanked out portion of the phase difference signal, comparing said non-blanked out portion with a reference signal at the first frequency, and producing a feedback error signal which controls the error correction circuit such that the amplitude of the modulation signal is adjusted in order to reduce the amplitude of the feedback error signal.

15. An apparatus for determining the rotation rate of an optical loop as defined in claim 14, wherein the second detector comprises:

a band pass filter electrically coupled to the output of the gating device, said filter permitting passage of components of the phase difference signal corresponding to the reference signal; and a lock-in amplifier electrically coupled to the filter and tuned to the frequency of the reference signal.

16. An apparatus for determining the rotation rate of an optical loop as defined in claim 15, further comprising a second signal generator electrically coupled to the lock-in amplifier for producing the reference signal, said second signal generator also providing a second modulation signal for phase modulating the counter-propagating waves at the first frequency to bias the range of the phase difference signal.

17. An apparatus for determining the rotation rate of an optical loop as defined in claim 16, further comprising:

means for detecting the amplitude of the modulation signal at the second frequency, said amplitude corresponding to the rotation rate of the optical loop; and means electrically connected to the amplitude detecting means for providing a representation of the rotation rate of the optical loop.

18. An apparatus for determining the rotation rate of an optical loop as defined in claim 17, wherein the means for detecting amplitude of the modulation signal comprises a bandpass filter tuned to the frequency of the modulation signal.

19. An apparatus for sensing phase shifts resulting from rotation of a fiber optic gyro having counter-propagating waves which have phase modulation at a first frequency and which are combined to form an optical output signal, the apparatus comprising:

means for phase modulating the counter-propagating waves at a second frequency which is lower than the first frequency;

means for providing the optical output signal during only a portion of each period of the second frequency phase modulation;

means for adjusting the amplitude of the second frequency phase modulation so that during the time the optical output signal is provided, the time average value of the second frequency phase modulation substantially cancels the component of said optical output signal at the first frequency caused by the rotation rate;

means for monitoring the amplitude of the second frequency phase modulation so as to identify the rotation rate of the rotation sensor.

20. An apparatus for sensing phase shifts resulting from rotation of a fiber optic gyro having counter-propagating waves which have phase modulation at a first frequency and which are combined to form an optical output signal, the apparatus comprising:

an electronic circuit for phase modulating the counter-propagating waves at a second frequency which is lower than the first frequency;

a gating device, responsive to the electronic circuit, for providing the optical output signal during only a portion of each period of the second frequency phase modulation;

a feedback circuit, responsive to the optical output signal, for adjusting the amplitude of the second frequency phase modulation so that during the time the optical output signal is provided, the time average value of the second frequency phase modulation substantially cancels the component of said optical output signal caused by the rotation rate; and an output circuit electrically connected to the phase modulating circuit for monitoring the amplitude of the second frequency phase modulation so as to identify the rotation rate of the fiber optic gyro.

21. An apparatus for sensing phase shifts resulting from rotation of a fiber optic gyro as defined in claim 20, wherein the electronic circuit comprises a signal generator for producing a modulation signal at the second frequency, said signal generator providing a gating signal to the gating device so that operation of the gating device is substantially synchronized with the second frequency phase modulation signal.

22. An apparatus for sensing phase shifts resulting from rotation of a fiber optic gyro as defined in claim 20, wherein the feedback circuit comprises:

a filter for passing a first frequency component of the output signal;

a lock-in amplifier responsive to the first frequency component from the filter for producing an error signal which is representative of the time average value of said first frequency component; and an error correction modulator electrically connected to the electronic circuit and responsive to the error signal for adjusting the amplitude of the second frequency modulation signal in order to reduce the amplitude of the error signal.

23. An apparatus for sensing phase shifts resulting from rotation of a fiber optic gyro as defined in claim 20, further comprising a phase modulator electrically connected to the fiber optic gyro so as to influence the phase difference modulation of the counter-propagating waves in response to the amplitude of first and second frequency modulation signals, thereby acting to bias the phase difference of the counter-propagating light waves to substantially null the phase shift produced in the counter-propagating light wave phase difference by the rotation rate.

24. A method of determining the rotation rate of an optical loop having counter-propagating light waves which are phase modulated at a first frequency and which are combined to form an output signal, wherein the method comprises:

phase modulating the counter-propagating light waves at a second, substantially fixed frequency;

blanking at least a component of the output signal at selected times to provide a gated signal;

adjusting the amplitude of the second frequency phase modulation to substantially null a component in the gated signal which is produced by the rotation rate; and measuring the amplitude of the second frequency phase modulation to determine the rotation rate.

25. An apparatus for determining the rotation rate of an optical loop wherein light waves are counter-propagated, said light waves having a phase difference which is shifted by the rotation rate of the optical loop, comprising:

first frequency phase modulating means for biasing the counter-propagating light wave phase difference, said first frequency being independent of the rotation rate;

means for combining the counter-propagating light waves to form an output signal;

means for blanking at least a component of the output signal at selected times to provide a gated signal;

second frequency phase modulating means for biasing the phase of the counter-propagating light waves, said second frequency being independent of the rotation rate; and means for driving the second frequency phase modulator means at said second frequency to substantially null a component in the gated signal which is produced by the rotation rate, said driving means providing a signal representative of said rotation rate.

26. An apparatus for determining the rotation rate of an optical loop wherein optical signals are counter-propagated and combined to form a periodically varying output signal comprised of plural periods, comprising:

means for providing a continuous wave optical signal to the optical loop to form two continuous waves which traverse the loop in opposite directions and are combined to form the output signal;

means for blanking corresponding portions of each of said plural periods of the output signal to provide a gated signal, said blanked portion comprising a signal which has traversed the entire loop in opposite directions; and means for biasing the phase of the two continuous waves traversing the loop to substantially null a component in the gated signal which is produced by loop rotation, wherein the amount of bias represents the loop rotation rate.

27. An apparatus for determining the rotation rate of an optical loop as defined in claim 26, wherein the blanked portion of the output signal comprises a periodically-varying sinusoidal waveform.

28. An apparatus for determining the rotation rate of an optical loop as defined in claim 26, wherein the output signal comprises a periodically-varying sinusoidal waveform and wherein the blanking means blanks alternate half cycles of the sinusoidal waveform.

29. A method of determining the rotation rate of an optical loop wherein optical signals are counter-propagated and combined to form an output signal, comprising the steps of:

providing a continuous wave optical signal to the optical loop to form two continuous waves which traverse the loop in opposite directions and are combined to form the output signal;

blanking a portion of the output signal to provide a gated signal in response to measurement of a single portion of the output signal at any given time, said blanked portion comprising a signal which has traversed the entire loop in opposite directions; and biasing the phase of the two continuous waves traversing the loop to substantially null a component in the gated signal which is produced by loop rotation, wherein the amount of bias represents the loop rotation rate.

* * * * *

UNITED STATES PATENT AND TRADEMARK OFFICE
CERTIFICATE OF CORRECTION

PATENT NO. : 4,728,192

DATED : March 1, 1988

INVENTOR(S) : Shaw et al.

It is certified that error appears in the above-identified patent and that said Letters Patent is hereby corrected as shown below:

Column 3, line 22, please correct "sawtooth waveform" to --sawtooth modulation--.

Column 3, line 58, please correct "having the fiber" to --showing the fiber--.

Column 14, line 32, please correct "99" to --910--.

Column 14, line 56, please correct "96" to --98--.

Column 22, line 68, please correct "$\Omega_m = 2\pi F_{mj}$" to --"$\omega_m = 2\pi \dot{F}_{mj}$"--.

Column 34, line 8, please correct "output circuit" to --adjust circuit--.

Signed and Sealed this

Nineteenth Day of June, 1990

Attest:

HARRY F. MANBECK, JR.

Attesting Officer

Commissioner of Patents and Trademarks